US012748298B2

(12) United States Patent
Tojo

(10) Patent No.: US 12,748,298 B2
(45) Date of Patent: Sep. 29, 2026

(54) CONTROL APPARATUS, RECORDING MEDIUM RECORDING LEARNED MODEL, AND MOVEMENT SUPPORT METHOD

(71) Applicant: OLYMPUS CORPORATION, Tokyo (JP)

(72) Inventor: Ryo Tojo, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 1213 days.

(21) Appl. No.: 17/469,242

(22) Filed: Sep. 8, 2021

(65) Prior Publication Data

US 2021/0405344 A1 Dec. 30, 2021

Related U.S. Application Data

(63) Continuation of application No. PCT/JP2019/012618, filed on Mar. 25, 2019.

(51) Int. Cl.
*G02B 23/24* (2006.01)
*G06T 7/00* (2017.01)

(52) U.S. Cl.
CPC ........ *G02B 23/2484* (2013.01); *G06T 7/0016* (2013.01); *G06T 2207/10068* (2013.01); *G06T 2207/20081* (2013.01); *G06T 2207/30028* (2013.01)

(58) Field of Classification Search
CPC .......... A61B 1/045; G06T 2207/10068; G06T 2207/20081; G06T 2207/30028; G06T 7/0016; G06T 7/70; G02B 23/2484; G02B 23/24
See application file for complete search history.

(56) References Cited

U.S. PATENT DOCUMENTS

| | | | |
|---|---|---|---|
| 2018/0296281 A1 | 10/2018 | Yeung et al. | |
| 2020/0138269 A1 * | 5/2020 | Nishimura | A61B 1/0005 |

FOREIGN PATENT DOCUMENTS

| | | |
|---|---|---|
| CN | 108685560 A | 10/2018 |
| JP | 2007-282857 A | 11/2007 |
| WO | 2008/155828 A1 | 12/2008 |
| WO | 2018159347 A1 | 9/2018 |
| WO | 2018/235185 A1 | 12/2018 |

OTHER PUBLICATIONS

International Search Report dated Apr. 16, 2019 received in PCT/JP2019/012618.

* cited by examiner

*Primary Examiner* — Moshe Wilensky
(74) *Attorney, Agent, or Firm* — Scully, Scott, Murphy & Presser, P.C.

(57) ABSTRACT

A control apparatus includes a processor. The processor detects an image pickup scene based on a picked-up image acquired by an image pickup apparatus disposed in an insertion section included in an endoscope and calculates operation information corresponding to the image pickup scene using an approach of machine learning.

17 Claims, 25 Drawing Sheets

CONTROL APPARATUS, RECORDING MEDIUM RECORDING LEARNED MODEL, AND MOVEMENT SUPPORT METHOD

CROSS REFERENCE TO RELATED APPLICATION

This application is a continuation application of PCT/JP2019/012618 filed on Mar. 25, 2019, the entire contents of which are incorporated herein by this reference.

BACKGROUND OF THE INVENTION

1. Field of the Invention

The present invention relates to a control apparatus, a recording medium recording a learned model, and a movement support method and, more particularly, to, in insertion of a distal end portion of an insertion section of an endoscope into a lumen of a subject, a control apparatus that supports inserting operation of the distal end portion of the insertion section, a recording medium recording a learned model, and a movement support method.

2. Description of the Related Art

There have been widely used, in the medical field, the industrial field, and the like, an endoscope system including an endoscope that picks up an image of an object inside of a subject and a video processor that generates an observation image of the object picked up by the endoscope.

When a distal end portion of an insertion section is inserted into a lumen in the subject using the endoscope, there occurs a scene in which it is difficult for a surgeon to determine a traveling direction of an insertion section. For example, in inserting operation of a large intestine endoscope, in some case, the lumen changes to a folded state or a crushed state because a large intestine bends (hereinafter, such a state of the lumen is collectively referred to as a "folded lumen"). In such a case, the surgeon needs to fold the distal end portion of the insertion section of the endoscope and cause the distal end portion of the insertion section to slip into the lumen. However, when the surgeon is unaccustomed to endoscope operation, the surgeon sometimes cannot determine in which direction the surgeon should cause the distal end portion of the insertion section to slip into the folded lumen.

In other words, when the "folded lumen" described above appears, as an example of operation for causing the distal end portion of the insertion section to slip into the folded lumen thereafter, for example, it is assumed that a temporally different plurality of kinds of operation such as push operation and angle operation of the distal end portion of the insertion section are necessary in operation of the endoscope. However, in the case of a surgeon unaccustomed to endoscope operation, it is considered difficult to accurately assume and execute a plurality of kinds of operation that can be taken in future.

Japanese Patent Application Laid-Open Publication No. 2007-282857 discloses an inserting direction detection apparatus that classifies a scene according to a feature value and, even when a plurality of feature values are present, calculates a class of a main feature value and performs inserting direction calculation corresponding to the feature value to display an accurate inserting direction.

International Publication WO 2008/155828 discloses a technique for detecting position information of an insertion section with position detecting means and recording the position information and, when a lumen is lost sight of, calculating an inserting direction based on the recorded position information.

SUMMARY OF THE INVENTION

A control apparatus according to an aspect of the present invention includes a processor. The processor detects an image pickup scene based on a picked-up image acquired by an image pickup apparatus disposed in an insertion section included in an endoscope and calculates operation information corresponding to the image pickup scene using an approach of machine learning.

A recording medium recording a learned model according to an aspect of the present invention is a non-transitory recording medium that records a learned model for causing a computer to function to output operation information and is readable by the computer. The learned model causes, based on a picked-up image corresponding to the operation information of an endoscope and a result of performing operation, the computer to function to output the operation information to be performed by the endoscope next.

A movement support method according to an aspect of the present invention is a method of supporting movement of an endoscope, the movement support method including: detecting an image pickup scene based on a picked-up image acquired by an image pickup apparatus disposed in an insertion section of the endoscope; and calculating operation information corresponding to the image pickup scene using an approach of machine learning.

DETAILED DESCRIPTION OF THE PREFERRED EMBODIMENTS

Embodiments of the present invention are explained below with reference to the drawings.

First Embodiment

Figure 1:
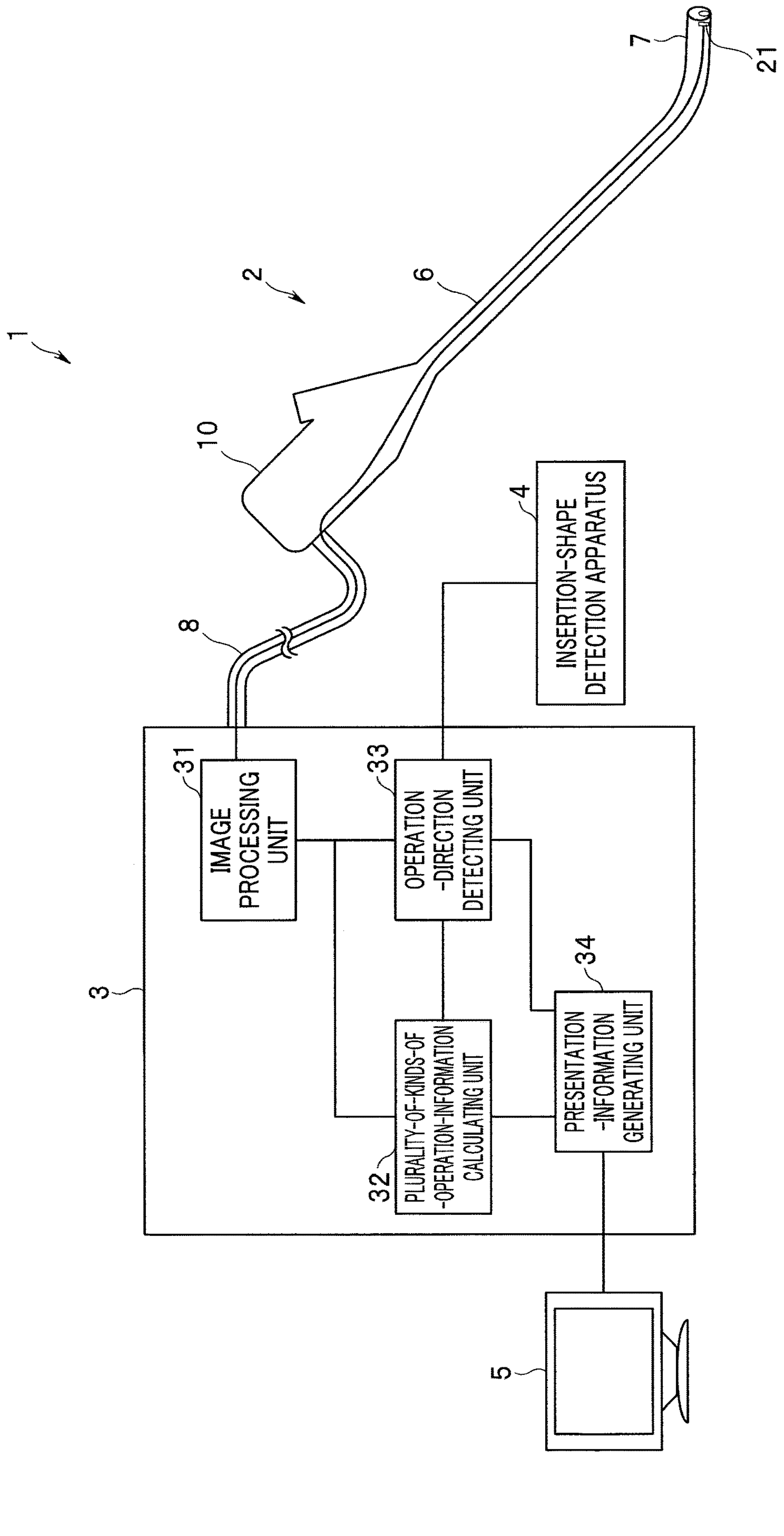
FIG. 1 is a block diagram showing a configuration of an endoscope system including a movement support system according to a first embodiment of the present invention.

FIG. 1 is a block diagram showing a configuration of an endoscope system including a movement support system according to a first embodiment of the present invention.

Figure 2:
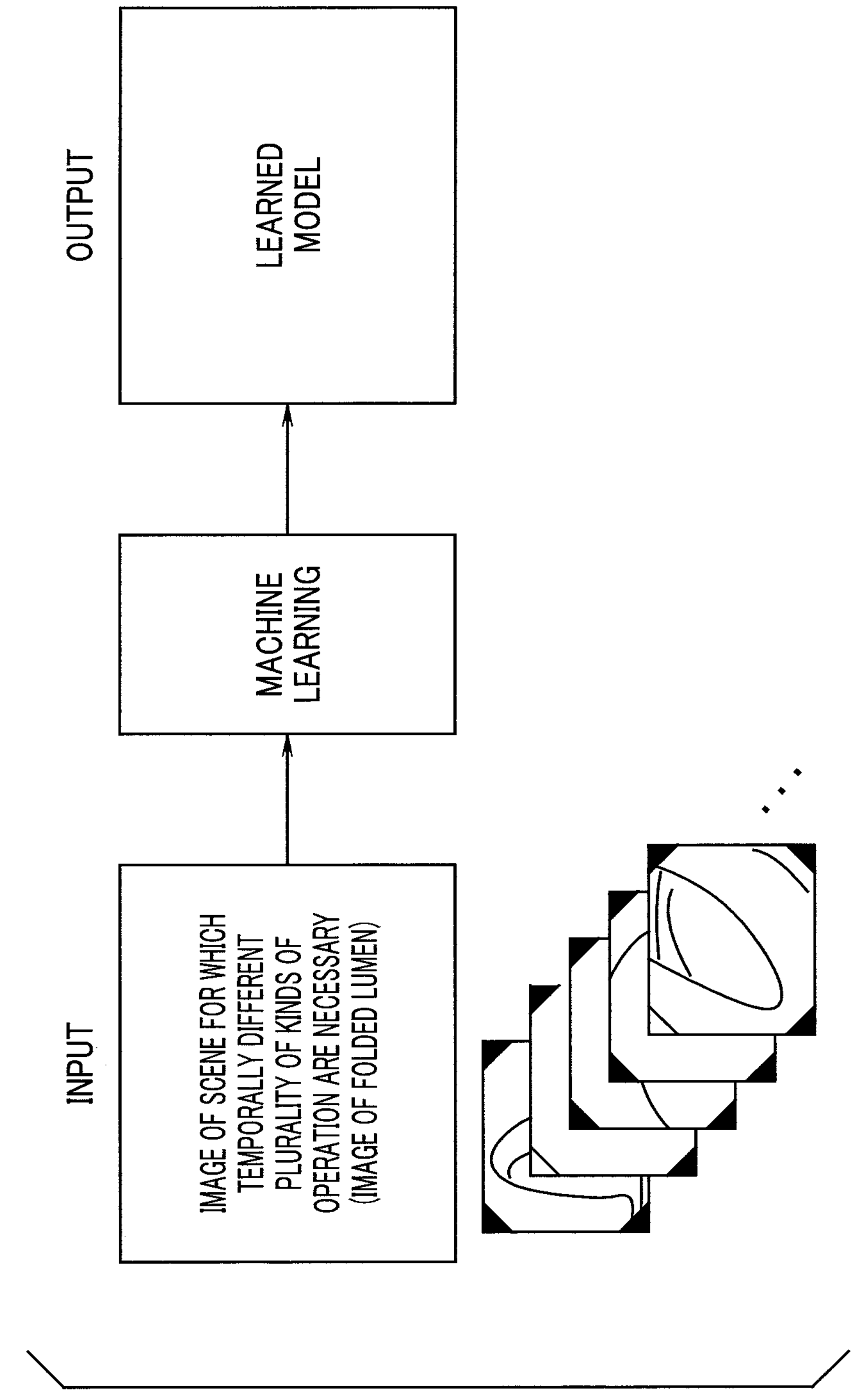
FIG. 2 is a diagram for explaining an approach of machine learning adopted in the movement support system in the first embodiment.

FIG. 2 is a diagram for explaining an approach of machine learning adopted in the movement support system in the first embodiment.

As shown in FIG. 1, an endoscope system 1 according to the present embodiment mainly includes an endoscope 2, a not-shown light source apparatus, a video processor 3 (a control apparatus), an insertion-shape detection apparatus 4, and a monitor 5.

The endoscope 2 includes an insertion section 6 to be inserted into a subject, an operation section 10 provided on a proximal end side of the insertion section 6, and a universal cord 8 extended from the operation section 10. The endoscope 2 is configured to be removably connected to the not-shown light source apparatus via a scope connector provided at an end portion of the universal cord 8.

Further, the endoscope 2 is configured to be removably connected to the video processor 3 via an electric connector provided at an end portion of an electric cable extended from the scope connector. A light guide (not shown) for transmitting illumination light supplied from the light source apparatus is provided insides of the insertion section 6, the operation section 10, and the universal cord 8.

The insertion section 6 has a flexibility and an elongated shape. The insertion section 6 is configured by providing, in order from a distal end side, a rigid distal end portion 7, a bendably formed bending section, and a long flexible tube portion having flexibility.

In the distal end portion 7, an illumination window (not shown) for emitting, to an object, the illumination light transmitted by the light guide provided inside of the insertion section 6 is provided. In the distal end portion 7, an image pickup unit 21 (an image pickup apparatus) configured to perform an operation corresponding to an image pickup control signal supplied from the video processor 3 and pick up an image of an object illuminated by the illumination light emitted through the illumination window and output an image pickup signal is provided. The image pickup unit 21 includes an image sensor such as a CMOS image sensor or a CCD image sensor.

The operation section 10 has a shape for enabling an operator (a surgeon) to grip and operate the operation section 10. In the operation section 10, an angle knob configured to enable the operator (the surgeon) to perform operation for bending the bending section in upward, downward, left, and right (UDLR) four directions crossing a longitudinal axis of the insertion section 6 is provided. In the operation section 10, one or more scope switches for enabling the operator (the surgeon) to perform an instruction corresponding to input operation, for example, release operation is provided.

Although not shown, the light source apparatus includes, for example, one or more LEDs or one or more lamps as light sources. The light source apparatus is configured to be able to generate illumination light for illuminating an inside of a subject into which the insertion section 6 is inserted and supply the illumination light to the endoscope 2. The light source apparatus is configured to be able to change a light amount of the illumination light according to a system control signal supplied from the video processor 3.

The insertion-shape detection apparatus 4 is configured to be removably connected to the video processor 3 via a cable. In the present embodiment, the insertion-shape detection apparatus 4 is configured to detect a magnetic field emitted from, for example, a source coil group provided in the insertion section 6 and acquire, based on intensity of the detected magnetic field, a position of each of a plurality of source coils included in the source coil group.

The insertion-shape detection apparatus 4 is configured to calculate an insertion shape of the insertion section 6 based on the position of each of the plurality of source coils acquired as explained above and generate insertion shape information indicating the calculated insertion shape and output the insertion shape information to the video processor 3.

The monitor 5 is removably connected to the video processor 3 via a cable and includes, for example, a liquid crystal monitor. The monitor 5 is configured to be able to display, on a screen, "a temporally different plurality of kinds of operation guide" or the like relating to the insertion section presented to the operator (the surgeon) under control by the video processor 3 in addition to an endoscopic image outputted from the video processor 3.

The video processor 3 includes a control unit that manages control of respective circuits in the video processor 3 and includes an image processing unit 31, a plurality-of-kinds-of-operation-information calculating unit 32, an operation-direction detecting unit 33, and a presentation-information generating unit 34.

The image processing unit 31 acquires an image pickup signal outputted from the endoscope 2 and applies predetermined image processing to the image pickup signal and generates a time-series endoscopic image. The video processor 3 is configured to perform a predetermined operation for causing the monitor 5 to display the endoscopic image generated by the image processing unit 31.

The plurality-of-kinds-of-operation-information calculating unit 32 calculates, based on a picked-up image acquired by the image pickup unit 21 disposed in the insertion section 6 in the endoscope 2, a plurality of kinds of operation information indicating a temporally different plurality of kinds of operation corresponding to a plurality of kinds of operation target scene, which is a scene in which "a temporally different plurality of kinds of operation" are necessary.

<Scenes in which "a Temporally Different Plurality of Kinds of Operation" are Necessary>

Prior to explanation about specific characteristics of the plurality-of-kinds-of-operation-information calculating unit 32, a specific example of the plurality of kinds of operation target scene, which is the scene in which "a temporally different plurality of kinds of operation" are necessary, and problems of the specific example are explained.

A representative example of the scenes in which "a temporally different plurality of kinds of operation" are necessary is a "folded lumen" in a state in which, when a lumen in a body cavity of a subject into which the insertion section 6 is inserted is a large intestine, the lumen is folded or crushed because the large intestine bends.

Note that examples of "a temporally different plurality of kinds of operation" include a plurality of kinds of operation in causing the insertion section to advance and slip into the folded lumen, that is, operation for causing the insertion section to advance, operation for twisting the insertion section, and combined operation of these kinds of operation.

It is assumed that, in a state in which the lumen is the "folded lumen", the distal end portion 7 in the insertion section 6 is inserted into the lumen and a distal end face of the distal end portion 7 reaches a position facing the "folded lumen". At this time, since the "folded lumen" is in a state in which the lumen is closed, that is, an intestine is not opened, a state of the lumen ahead of the "closed lumen" cannot be viewed. It is considered difficult for the surgeon to accurately determine advancing operation of the distal end portion of the insertion section that can be taken thereafter.

In the case of such a situation, for example, it is assumed that, after the distal end portion of the insertion section is straightly advanced toward a closed lumen and inserted into the part, it is necessary to bend the distal end portion of the insertion section in a direction conforming to a shape of an intestine (that is, the plurality of kinds of operation (advancing operation of the insertion section, the twisting operation of the insertion section, and the like) explained above are necessary). At this time, a sufficiently experienced surgeon is considered to be capable of accurately coping with such a situation. However, in the case of an inexperienced surgeon unaccustomed to endoscope operation, it is considered difficult to accurately assume a plurality of kinds of operation that can be taken in future.

For example, in a situation in which the surgeon faces a scene of the "folded lumen", if the surgeon inserts the distal end portion of the insertion section in an inappropriate direction, it is also likely that a patient, who is a subject, is forced to bear an unnecessary burden. Therefore, it is considered extremely useful to present accurate operation guide information, that is, a plurality of kinds of operation guide information, times of which are different, in time series that can be taken in future to the inexperienced surgeon.

In view of such circumstances, the applicant of the present invention provides a movement support system that accurately presents, when a surgeon performing endoscope operation faces a scene requiring "a temporally different plurality of kinds of operation" of a folded lumen or the like, guide information of advancing operation of a distal end portion of an insertion section that can be taken in future.

Referring back to FIG. 1, the explanation of the specific configuration of the plurality-of-kinds-of-operation-information calculating unit 32 is continued.

In the first embodiment, the plurality-of-kinds-of-operation-information calculating unit 32 calculates, for an image inputted from the image processing unit 31, based on a learning model (a learned model) obtained using an approach by machine learning or the like, or using an approach of detecting a feature value, for a scene in which a depth direction of a folded part cannot be directly seen, a plurality of kinds of operation information indicating a temporally different plurality of kinds of operation corresponding to the plurality of kinds of operation target scene taking into account characteristic information of a shape of an intestine.

The plurality-of-kinds-of-operation-information calculating unit 32 further calculates likelihood of a plurality of kinds of operation information. The plurality-of-kinds-of-operation-information calculating unit 32 sets a threshold for the likelihood of the plurality of kinds of operation information in advance and, when the likelihood is equal to or higher than the threshold, outputs a plurality of kinds of operation information for the plurality of kinds of operation target scene to the presentation-information generating unit. On the other hand, when the likelihood is lower than the threshold, the plurality-of-kinds-of-operation-information calculating unit 32 determines that an image inputted from the image processing unit 31 is not the plurality of kinds of operation target scene or the image is the plurality of kinds of operation target scene but the likelihood of the plurality of kinds of operation information is low and does not output the plurality of kinds of operation information to the presentation-information generating unit.

<Machine Learning in the Plurality-of-Kinds-of-Operation-Information Calculating Unit in the First Embodiment>

An approach of machine learning adopted in the plurality-of-kinds-of-operation-information calculating unit 32 in the first embodiment is explained.

FIG. 2 is a diagram for explaining an approach of machine learning adopted in the movement support system in the first embodiment.

The plurality-of-kinds-of-operation-information calculating unit 32 in the movement support system in the first embodiment creates teacher data for machine learning from a large number of images (for example, an image relating to the folded lumen explained above) relating to a scene in which a plurality of kinds of operation, times of which are different, in time series are necessary among a large number of endoscopic image information relating to a lumen such as a large intestine of a subject.

More specifically, first, the plurality-of-kinds-of-operation-information calculating unit 32 according to the first embodiment collects moving images of an actual endoscopy. Subsequently, an operator (hereinafter, an annotator), who creates teacher data, extracts, according to determination by the annotator, an image of a scene for which a temporally different plurality of kinds of operation are necessary like a "folded lumen" among the moving images of the actual endoscopy. The annotator desirably has experience and knowledge with which an inserting direction with respect to the folded lumen can be determined. The annotator determines, based on movements of an intestinal wall and the like reflected in an endoscopic moving image, information concerning "endoscope operation (a temporally different plurality of kinds of operation)" performed following the scene and information concerning "whether the endoscope successfully proceeds as a result of the endoscope operation" and classifies the information.

More specifically, for example, when it can be surmised based on the endoscopic image or the like that an endoscope insertion section appropriately proceeds, the annotator determines that the "endoscope operation (the temporally different plurality of kinds of operation)" is a correct answer. The annotator links information concerning the "endoscope operation (the temporally different plurality of kinds of operation)", which is the correct answer for an image of a scene for which the temporally different plurality of kinds of operation are necessary like the "folded lumen", and creates teacher data.

A predetermined apparatus (a computer), which receives an instruction by a developer of the movement support system, creates a learning model in advance using an approach of machine learning such as deep learning based on the created teacher data (using the teacher data as an input) and incorporates the learning model in the plurality-of-kinds-of-operation-information calculating unit 32 (records a learned model in a non-transitory recording medium readably by a computer in the plurality-of-kinds-of-operation-information calculating unit 32). The plurality-of-kinds-of-operation-information calculating unit 32 calculates, based on the learning model, a plurality of kinds of operation information indicating a temporally different plurality of kinds of operation corresponding to the plurality of kinds of operation target scene.

In the present embodiment, the operation-direction detecting unit 33 acquires the insertion shape information of the insertion section outputted from the insertion-shape detection apparatus 4 and detects, based on the information, operation direction information same as conventional operation direction information in the past relating to the insertion section 6 inserted into a lumen (for example, a large intestine) of the subject. The operation direction information is, for example, direction information of the lumen calculated based on the endoscopic image and the shape information of the insertion-shape detection apparatus 4 when the lumen in the body cavity is lost sight of.

For example, the operation-direction detecting unit 33 grasps a state of the insertion section 6 based on a position where the lumen is lost sight of on the endoscopic image, the insertion shape information outputted from the insertion-shape detection apparatus 4, and the like, detects, for example, a movement of a distal end of the insertion section 6, and calculates a position in a lumen direction with respect to the distal end of the insertion section 6. In other words, the operation-direction detecting unit 33 detects operation direction information indicating a direction in which the distal end portion 7 of the insertion section 6 should be operated.

Figure 3:
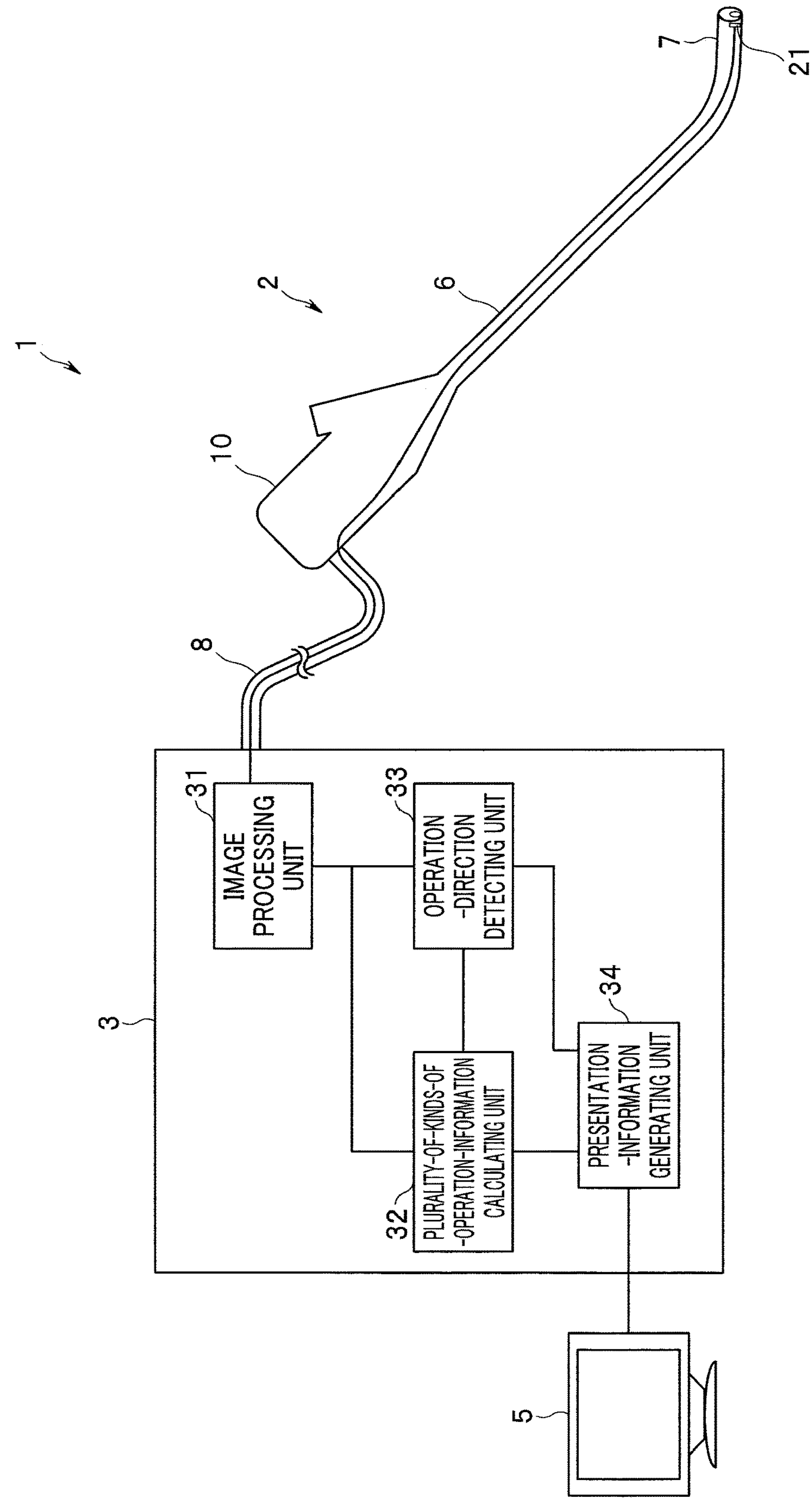
FIG. 3 is a block diagram showing a modification of the endoscope system including the movement support system according to the first embodiment.

Note that in the present embodiment, the operation-direction detecting unit 33 calculates the operation direction information based on the endoscopic image and the shape information of the insertion-shape detection apparatus 4. However, the operation-direction detecting unit 33 is not limited to this and may calculate the operation direction information based on only the endoscopic image. For example, in a configuration in which the insertion-shape detection apparatus 4 is omitted as in a modification shown in FIG. 3, the operation-direction detecting unit 33 may calculate a position where the lumen is lost sight of on the endoscopic image and present a direction in which the lumen is lost sight of as operation direction information. Further, the operation-direction detecting unit 33 may detect a movement of a feature point of the endoscopic image, detect a movement of the distal end of the insertion section 6 in a direction of the lumen lost sight of, and present a more accurate lumen direction.

The presentation-information generating unit 34 generates, based on the plurality of kinds of operation information calculated by the plurality-of-kinds-of-operation-information calculating unit 32, presentation information for the insertion section 6 (that is, for the surgeon), for example, presentation information of "a temporally different plurality of kinds of operation" relating to the insertion section 6 and outputs the presentation information to the monitor 5. The presentation-information generating unit 34 generates presentation information based on the operation direction information outputted by the operation-direction detecting unit 33 and outputs the presentation information to the monitor 5.

A specific example of presentation of "a temporally different plurality of kinds of operation" relating to the presentation-information generating unit 34 in the first embodiment is explained.

Figure 7:
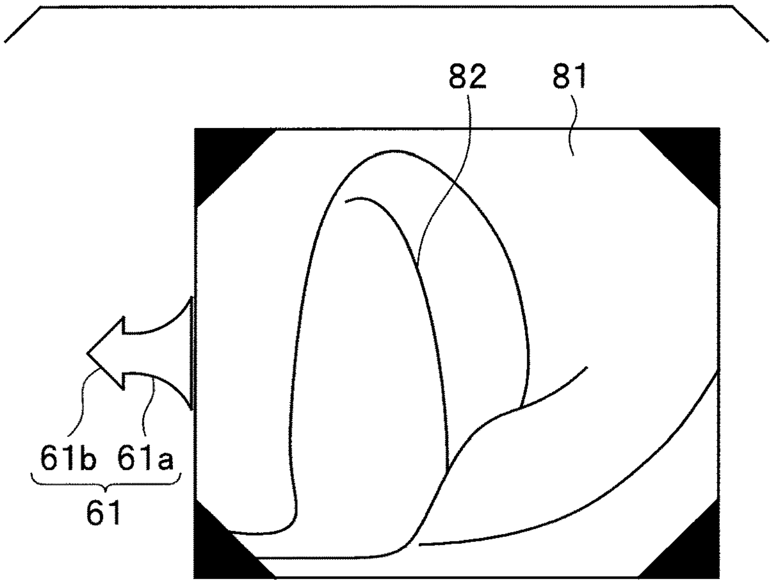
FIG. 7 is an explanatory diagram showing a presentation example of "a temporally different plurality of kinds of operation guide" relating to an insertion section presented to a surgeon in a state in which a distal end portion of the insertion section faces a folded lumen in the movement support system in the first and second embodiment.

More specifically, when a lumen 81 is displayed in an endoscopic image displayed on the monitor 5 shown in FIG. 7 (explained as a display example according to a second embodiment) and when a folded lumen 82 is located in a position that the distal end portion 7 of the insertion section 6 faces, the presentation-information generating unit 34 presents, for example, operation guide display 61 on a screen of the monitor 5 based on the plurality of kinds of operation information calculated by the plurality-of-kinds-of-operation-information calculating unit 32.

The operation guide display 61 is a guide showing a temporally different plurality of kinds of operation in time series in advancing operation of the distal end portion 7 of the insertion section 6 with respect to the folded lumen 82. In the first embodiment, the operation guide display 61 is arrow display obtained by combining first operation guide display 61*a* corresponding to substantially straight advancing direction operation in a first stage and second operation guide display 61*b* corresponding to bending direction operation in a second stage after the distal end portion 7 of the insertion section 6 slips through the folded lumen 82 after the substantially straight advancing direction operation in the first stage.

The operation guide display 61 is configured by user interface design with which the surgeon viewing the guide display can intuitively recognize that the advancing operation in the two stages (a plurality of stages) explained above is desirable. For example, the operation guide display 61 includes a characteristic taper curve from an arrow root portion of the first operation guide display 61*a* to an arrow distal end portion of the second operation guide display 61*b* or contrivance for displaying the operation guide display 61 in gradation is performed.

Note that in the present embodiment, the operation guide display 61 assumes the arrow shape. However, the operation guide display 61 is not limited to this and may be another sign or icon if the sign or the icon is notation with which the surgeon can intuitively recognize the advancing operation in the plurality of stages. The direction of the arrow is not limited to a left-right direction or the like and may be multi-direction (for example, eight-direction) display or may be display in a no-stage direction.

These other display examples relating to the operation guide display 61 are illustrated in a second embodiment explained below.

Note that in the present embodiment, the presentation-information generating unit 34 may generate, as the presentation information, information relating to a predetermined operation amount concerning the plurality of kinds of operation and output the information to the monitor 5 or may generate, as the presentation information, information relating to a progress state of the plurality of kinds of operation and output the information to the monitor 5.

Further, the video processor 3 is configured to generate and output various control signals for controlling operations of the endoscope 2, the light source apparatus, the insertion-shape detection apparatus 4, and the like.

Note that in the present embodiment, the respective units of the video processor 3 may be configured as individual electronic circuits or may be configured as circuit blocks in an integrated circuit such as an FPGA (field programmable gate array). In the present embodiment, for example, the video processor 3 may include one or more processors (CPUs or the like).

Effects of the First Embodiment

In the movement support system in the first embodiment, when the surgeon performing the endoscope operation faces a scene requiring "a temporally different plurality of kinds of operation" of a folded lumen or the like (for example, a scene in which, since an intestine is not opened, a state of a lumen ahead of the intestine cannot be viewed and it is difficult for the surgeon to accurately determine advancing operation of the distal end portion of the insertion section that can be taken thereafter), guide information of the advancing operation of the distal end portion of the insertion section that can be taken thereafter can be accurately presented. Accordingly, insertability of the endoscope operation can be improved.

Second Embodiment

A second embodiment of the present invention is explained.

Compared with the first embodiment, a movement support system in the second embodiment is characterized by including a scene detecting unit in the video processor 3, detecting a scene (an image pickup scene) from a picked-up image from the image processing unit 31 and classifying a state of a lumen, and presenting an advancing operation guide for the insertion section 6 corresponding to the classification.

Since the other components are the same as the components in the first embodiment, only the differences from the first embodiment are explained. Explanation about common portions is omitted.

Figure 4:
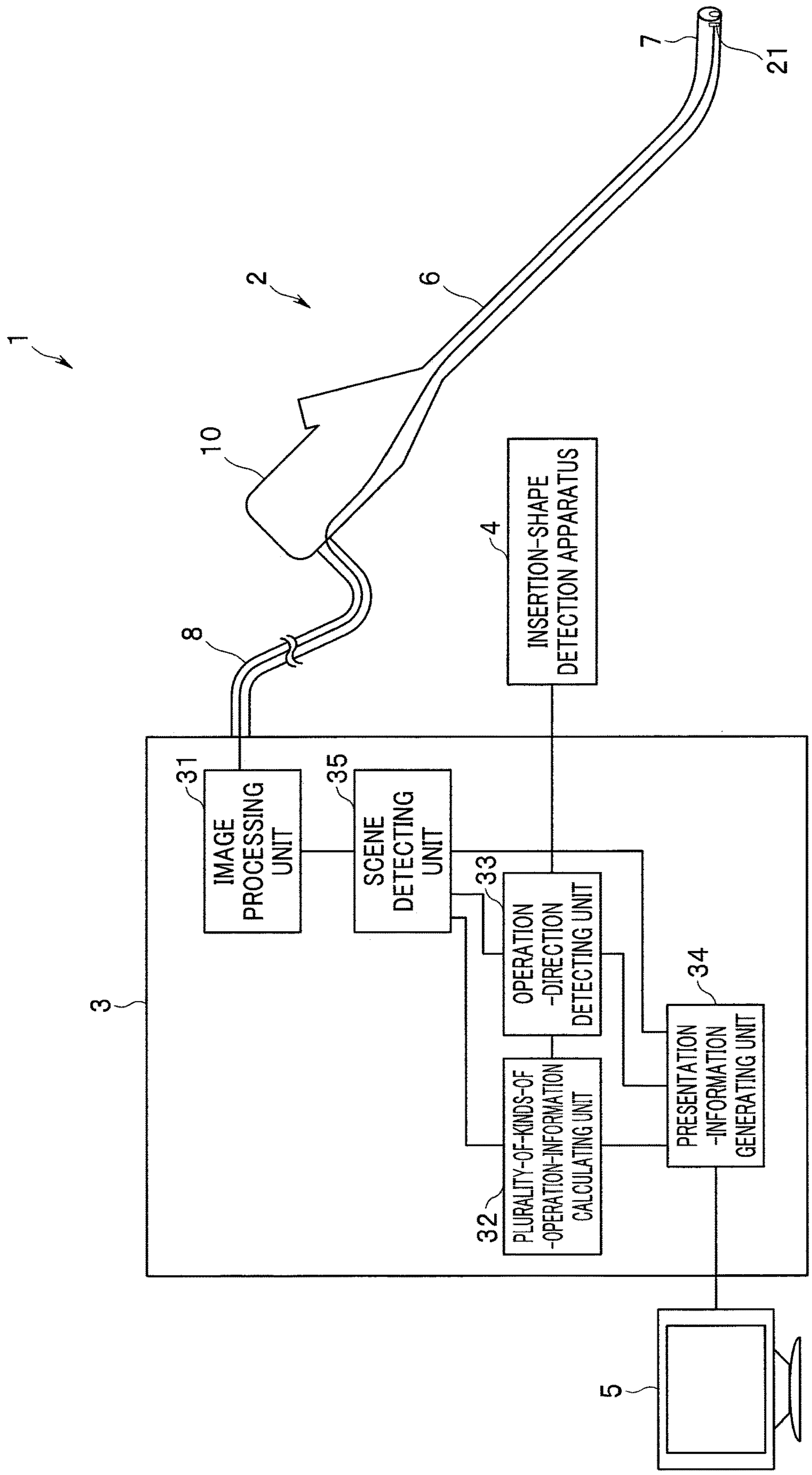
FIG. 4 is a block diagram showing a configuration of an endoscope system including a movement support system according to a second embodiment of the present invention.
Figure 5:
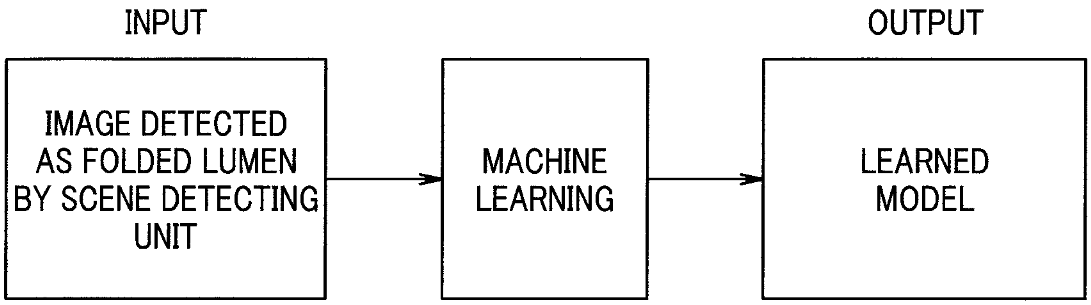
FIG. 5 is a diagram for explaining an approach of machine learning adopted in the movement support system in the second embodiment.
Figure 6:
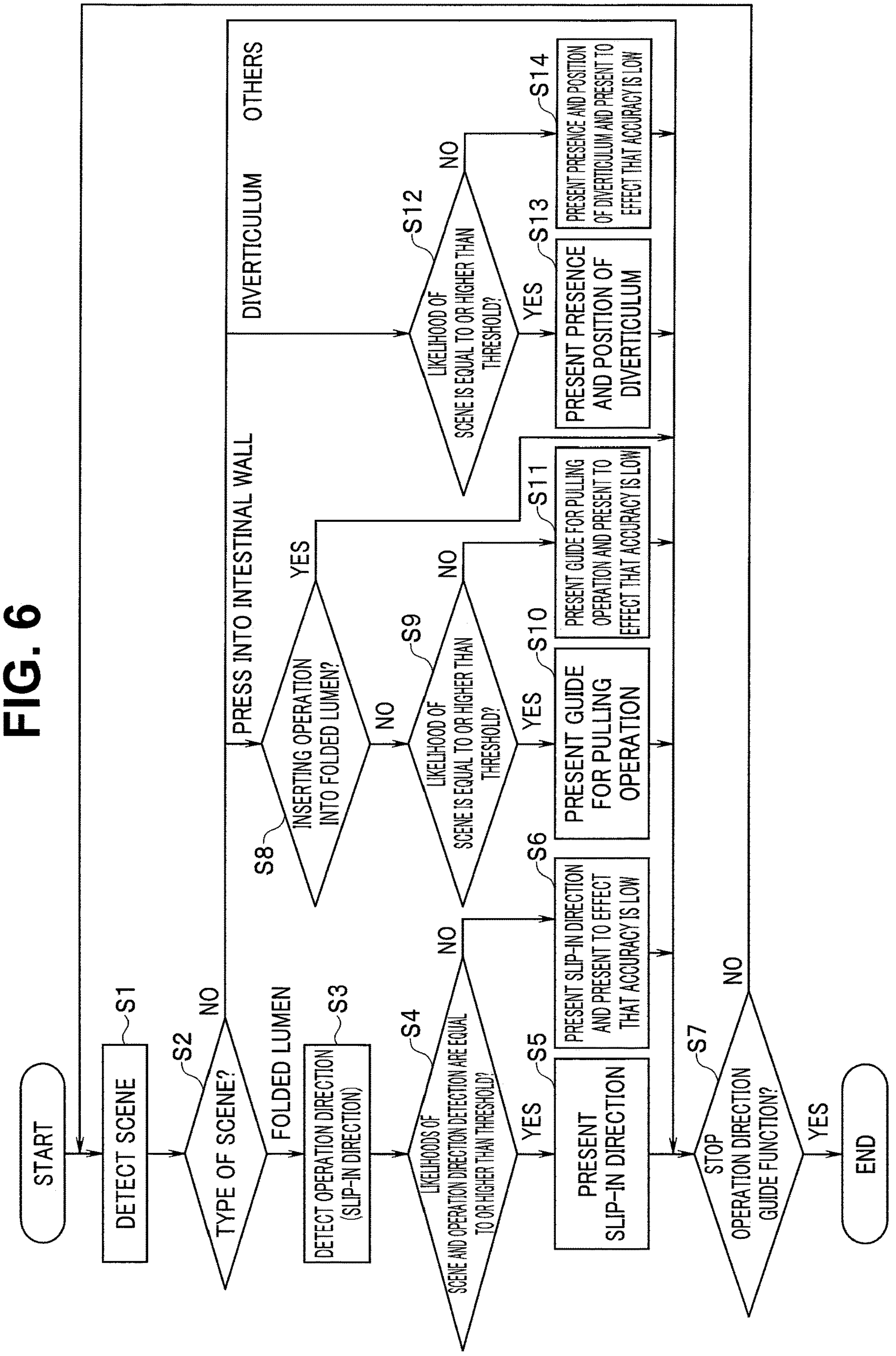
FIG. 6 is a flowchart showing action of a scene detecting unit and a presentation-information generating unit in the movement support system in the second embodiment.

FIG. 4 is a block diagram showing a configuration of an endoscope system including the movement support system according to the second embodiment of the present invention. FIG. 5 is a diagram for explaining an approach of machine learning adopted in the movement support system in the second embodiment. FIG. 6 is a flowchart showing action of a scene detecting unit and a presentation-information generating unit in the movement support system in the second embodiment.

As shown in FIG. 4, the endoscope system 1 according to the present embodiment mainly includes, as in the first embodiment, the endoscope 2, the not-shown light source apparatus, the video processor 3, the insertion-shape detection apparatus 4, and the monitor 5.

The endoscope 2 forms the same configuration as the configuration in the first embodiment. The insertion section 6 is configured by providing the rigid distal end portion 7, a bendably formed bending section, and a long flexible tube section having flexibility in order from a distal end side.

In the distal end portion 7, the image pickup unit 21 configured to perform an operation corresponding to an image pickup control signal supplied from the video processor 3 and pick up an image of an object illuminated by illumination light emitted through an illumination window and output an image pickup signal is provided. The image pickup unit 21 includes an image sensor such as a CMOS image sensor or a CCD image sensor.

In the second embodiment, the video processor 3 includes a control unit that manages control of respective circuits in the video processor 3 and includes a scene detecting unit 35 besides the image processing unit 31, the plurality-of-kinds-of-operation-information calculating unit 32, the operation-direction detecting unit 33, and the presentation-information generating unit 34.

As in the first embodiment, the image processing unit 31 is configured to acquire an image pickup signal outputted from the endoscope 2, apply predetermined image processing to the image pickup signal to generate a time-series endoscopic image, and perform a predetermined operation for causing the monitor 5 to display the endoscopic image generated by the image processing unit 31.

The scene detecting unit 35 classifies a state of the endoscopic image based on a picked-up image from the image processing unit 31 using an approach by machine learning or an approach of detecting a feature value. Types of classifications are, for example, a "folded lumen", "pressing into an intestinal wall", a "diverticulum", and others (a state in which a guide is unnecessary such as a normal lumen).

Note that in the present embodiment, examples of senses detected by the scene detecting unit 35 are a "folded lumen", "pressing into an intestinal wall", a "diverticulum", and "others". However, the scene detecting unit 35 may detect other scenes (image pickup scenes) according to content of presentation information or the like. The scene detecting unit 35 may detect scenes (image pickup scenes) such as a direction and an amount of operation (insertion and removal, bending, or rotation), an opened lumen, a state in which a lumen/a folded lumen is lost sight of, pressing into an intestinal wall, approach to the intestinal wall, a diverticulum, parts of a large intestine (a rectum, a sigmoid colon, a descending colon, a spleen curvature, a transverse colon, a liver curvature, an ascending colon, an intestinal cecum, an ileocecum, an ileocecal region, and an ileum), a substance or a state inhibiting observation (a residue, a bubble, blood, water, halation, and light amount insufficiency).

<Machine Learning in the Scene Detecting Unit 35 in the Second Embodiment>

An approach of machine learning adopted in the scene detecting unit 35 in the second embodiment is explained.

FIG. 5 is a diagram for explaining an approach of machine learning adopted in the movement support system in the second embodiment.

The scene detecting unit 35 in the movement support system in the second embodiment collects, for example, a large number of endoscopic image information relating to a lumen such as a large intestine of a subject. Subsequently, an annotator determines, based on the endoscopic image information, whether an endoscopic image is an image of a scene for which a temporally different plurality of kinds of operation is necessary like a "folded lumen".

The annotator links a classification label of the scene like the "folded lumen" to the endoscopic image and creates teacher data. The annotator also creates, with the same approach, teacher data of "pressing into an intestinal wall", a "diverticulum" and others (a state in which a guide is unnecessary such as a normal lumen).

A predetermined apparatus (a computer), which receives an instruction by a developer of the movement support system, creates a learning model in advance using an approach of machine learning such as deep learning based on the created teacher data (using the teacher data as an input) and incorporates the learning model in the scene detecting unit 35. The scene detecting unit 35 classifies a scene of a lumen based on the learning model. For example, the scene detecting unit 35 classifies the scene of the lumen into, for example, a "folded lumen", "pressing into an intestinal wall", a "diverticulum", and "others (a state in which a guide is unnecessary such as a normal lumen)".

The scene detecting unit 35 further detects whether inserting operation into the folded lumen 82 (see FIG. 7) is being performed. In the detection, for example, after the folded lumen 82 is detected, a movement of the insertion section 6 is detected from a temporal change in 3D-CNN. Alternatively, a movement of the insertion section 6 is detected by a technique of an optical flow.

When a scene detected by the scene detecting unit 35 is a "folded lumen", as in the first embodiment, the plurality-of-kinds-of-operation-information calculating unit 32 calculates, based on a picked-up image acquired by the image pickup unit 21 disposed in the insertion section 6 in the endoscope 2, a plurality of kinds of operation information indicating a temporally different plurality of kinds of operation corresponding to a plurality of kinds of operation target scene, which is a scene for which "a temporally different plurality of kinds of operation" are necessary.

As in the first embodiment, the plurality-of-kinds-of-operation-information calculating unit 32 in the second embodiment calculates, based on a learning model obtained using an approach by machine learning or the like, or using an approach of detecting a feature value, for a scene in which a depth direction of a folded part cannot be directly seen, a plurality of kinds of operation information indicating a temporally different plurality of kinds of operation corresponding to the plurality of kinds of operation target scene taking into account characteristic information of a shape of an intestine.

In the second embodiment, the presentation-information generating unit 34 generates, based on the plurality of kinds of operation information calculated by the plurality-of-kinds-of-operation-information calculating unit 32, presentation information for the insertion section 6 (that is, for the surgeon), for example, presentation information of "a temporally different plurality of kinds of operation" relating to the insertion section 6 and outputs the presentation information to the monitor 5.

Action of the Second Embodiment

Subsequently, action of an image recording apparatus in the second embodiment is explained with reference to a flowchart of FIG. 6.

First, when the video processor 3 in the movement support system in the second embodiment starts operation, first, the scene detecting unit 35 detects a scene (an image pickup scene). The scene detecting unit 35 classifies a scene of an endoscopic image from a picked-up image of an endoscope acquired from the image processing unit 31 using an approach by machine learning or an approach of detecting a feature value (step S1). Subsequently, the plurality-of-kinds-of-operation-information calculating unit 32 performs an arithmetic operation corresponding to a type of the scene detected by the scene detecting unit (step S2).

When the scene detecting unit 35 detects a scene for which presentation of an advancing operation guide for the insertion section is unnecessary (when the scene is classified into "others"), the plurality-of-kinds-of-operation-information calculating unit 32 does not perform an arithmetic operation of an operation direction. Accordingly, presentation of operation is not performed either. Consequently, it is possible to reduce possibility of unnecessary presentation to be performed. In other words, accuracy of presentation information can be improved. By not performing unnecessary presentation on the monitor 5, visibility of the monitor 5 for the surgeon can be improved.

On the other hand, when the scene is the "folded lumen" in step S2, the scene detecting unit 35 detects, with the approach by machine learning or the approach of detecting a feature value, a direction for causing the distal end portion 7 of the insertion section 6 to slip into the folded lumen (step S3).

When causing the distal end portion 7 of the insertion section 6 to slip into the folded lumen, it is necessary to not only simply insert the distal end portion 7 of the insertion section 6 but also bend the distal end portion 7 of the insertion section 6 in a direction conforming to a shape of an intestine halfway in the insertion. This is because, since the intestine is not opened in the folded lumen, it is difficult to recognize, from an image during the insertion, a direction in which the insertion section 6 advances and, therefore, it is necessary to recognize an advancing direction before the insertion.

Thereafter, the plurality-of-kinds-of-operation-information calculating unit 32 determines whether likelihood of the scene detected by the scene detecting unit 35 and likelihood of the advancing operation direction calculated by the plurality-of-kinds-of-operation-information calculating unit 32 are equal to or higher than a threshold (step S4). When both of the likelihoods are equal to or higher than the threshold, the presentation-information generating unit 34 generates a direction for causing the distal end portion 7 of the insertion section 6 to slip into the lumen (that is, guide information for advancing operation of the distal end portion 7 in the insertion section 6 with respect to the folded lumen 82) and presents the guide information to the monitor 5 (step S5; see FIG. 7).

Figure 10:
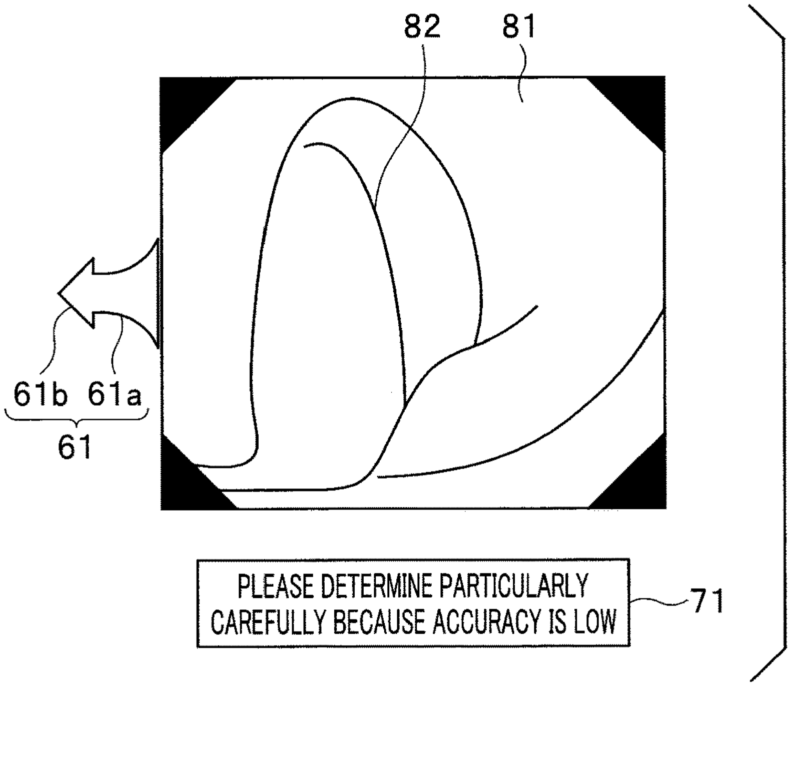
FIG. 10 is an explanatory diagram showing a presentation example of additional information in the case in which accuracy of presentation information of "a temporally different plurality of kinds of operation guide" relating to the insertion section presented to the surgeon in the state in which the distal end portion of the insertion section faces the folded lumen is low in the movement support system in the second embodiment.

On the other hand, when determining in step S4 that the likelihoods are lower than the threshold and accuracy (likelihood) of a presentation result is low, the presentation-information generating unit 34 presents to the effect that the accuracy of the presentation result is low (step S6; see FIG. 10). Note that in this case, the presentation-information generating unit 34 may perform display involving warning and present to the effect that determination by the surgeon is necessary. The scene detecting unit 35 may detect a substance (a residue, a bubble, or blood) inhibiting observation in the scene detection and determine that accuracy is low when the substance inhibiting the observation is detected.

Subsequently, a case is explained in which the scene detected by the scene detecting unit 35 is "pressing into an intestinal wall" in step S2 and insertion into the folded lumen is being performed (step S8). During the insertion into the folded lumen, in some case, the distal end portion 7 of the insertion section 6 is brought into contact with the intestinal wall or the distal end portion 7 of the insertion section 6 is inserted while being pressed with a weak force with less risk for the intestine. Therefore, the scene detecting unit 35 determines that the surgeon intentionally brings the distal end portion 7 of the insertion section 6 into contact with the intestinal wall or presses the distal end portion 7 of the insertion section 6 into the intestinal wall. Accordingly, even in the "pressing into an intestinal wall" scene, the presentation-information generating unit 34 does not present anything when the insertion into the folded lumen is being performed (step S7).

On the other hand, when the insertion into the folded lumen is not being performed in step S8 and the likelihood of the scene detected by the scene detecting unit 35 is equal to or higher than the threshold (step S9), it is likely that the distal end portion 7 of the insertion section 6 is pressed into the intestine to impose a burden on a patient. Therefore, the presentation-information generating unit 34 presents a guide for pulling operation for the insertion section 6 (step S10; see FIG. 13). Presentation information is not limited to the guide for the pulling operation and may be, for example, presentation for calling attention.

Figure 14:
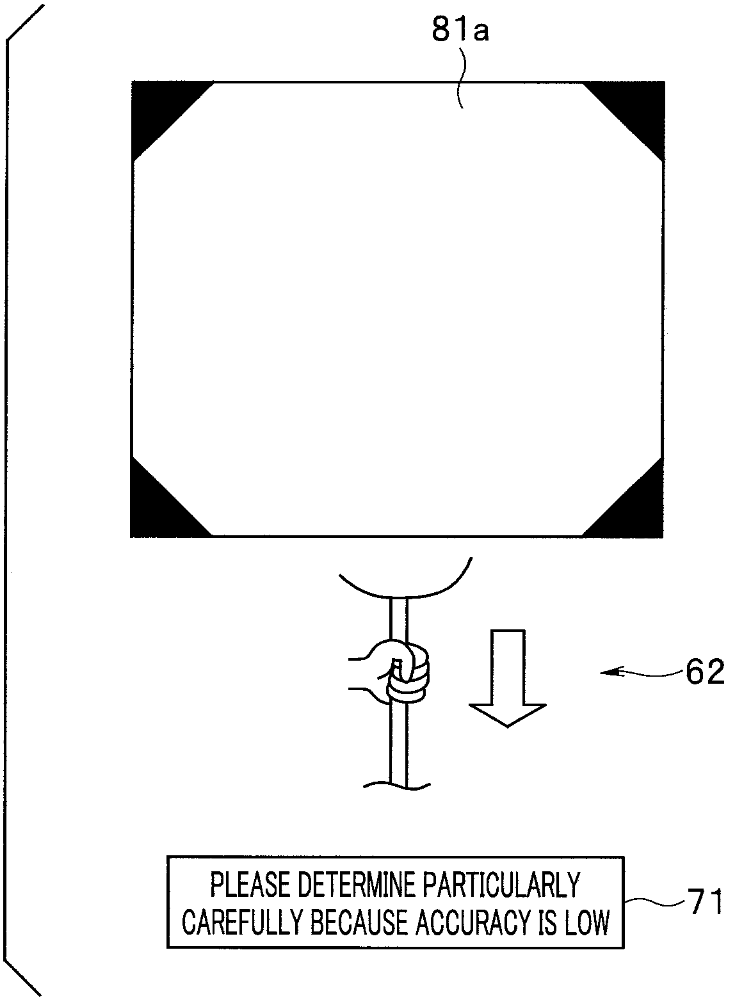
FIG. 14 is an explanatory diagram showing a presentation example of additional information in the case in which accuracy of presentation information of "an operation guide relating to an insertion section" presented to the surgeon in the state in which the distal end portion of the insertion section is pressed into the intestinal wall is low in the movement support system in the second embodiment.

On the other hand, when it is determined in step S9 that the likelihood is lower than the threshold and the accuracy (the likelihood) of the presentation result is low, as explained above, the presentation-information generating unit 34 presents to the effect that the accuracy of the presentation result is low (step S11; see FIG. 14).

Figure 15:
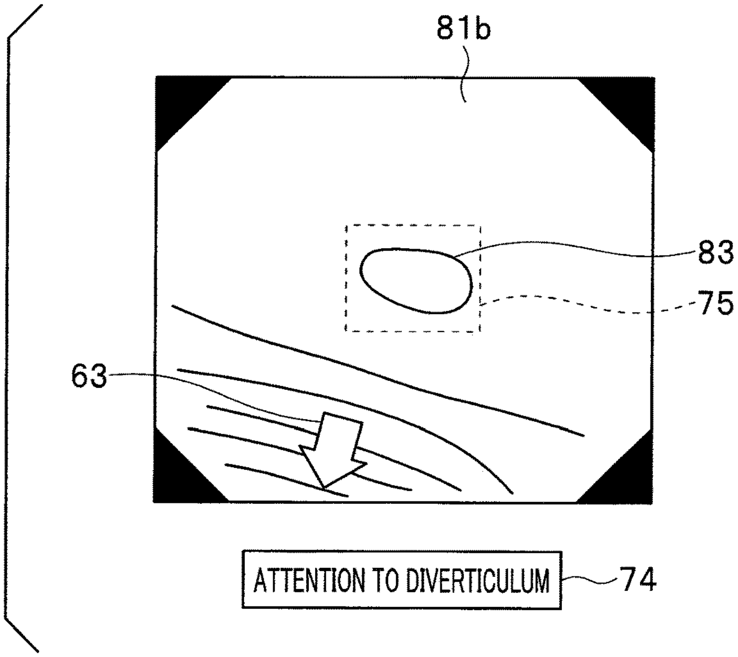
FIG. 15 is an explanatory diagram showing a presentation example of "an operation guide relating to an insertion section" presented to the surgeon when a diverticulum is found in the movement support system in the second embodiment.

When the scene detected by the scene detecting unit 35 is the "diverticulum" in step S2 and when the likelihood of the detected scene is equal to or higher than the threshold (step S12), since it is likely that the distal end portion 7 of the insertion section 6 is inserted into the diverticulum by mistake, the presentation-information generating unit 34 presents presence and a position of the diverticulum (step S13; see FIG. 15).

Figure 16:
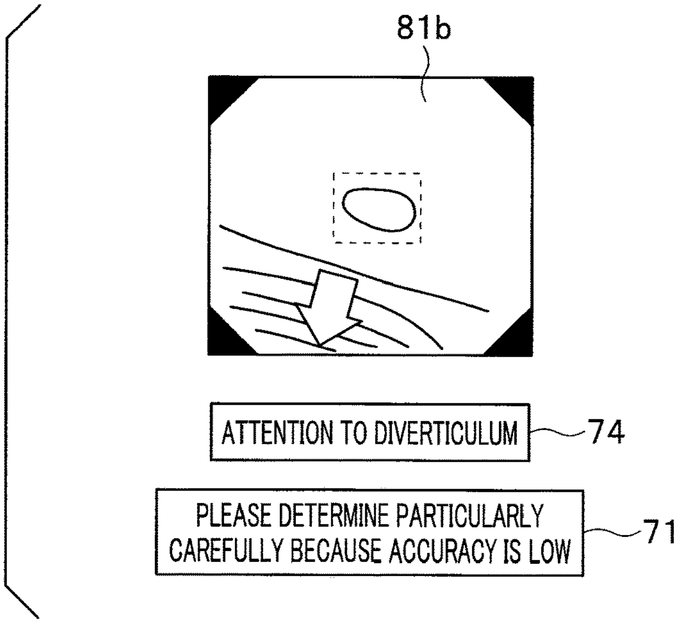
FIG. 16 is an explanatory diagram showing a presentation example of additional information in the case in which accuracy of presentation information of "an operation guide relating to an insertion section" presented to the surgeon when the diverticulum is found is low in the movement support system in the second embodiment.

On the other hand, when it is determined in step S12 that the likelihood is lower than the threshold and the accuracy (the likelihood) of the presentation result is low, as explained above, the presentation-information generating unit 34 presents to the effect that the accuracy of the presentation result is low (step S14; see FIG. 16).

Thereafter, the video processor 3 determines whether to stop an inserting direction guide function (step S7) and, when continuing the inserting direction guide function, repeats the processing. Note that the surgeon may instruct a stop of the inserting direction guide function with a predetermined input apparatus or the scene detecting unit 35 may be able to detect an intestinal cecum from a picked-up image outputted from the image processing unit 31 and, when detecting that the distal end portion 7 of the insertion section 6 reaches the intestinal cecum, determine to stop the inserting direction guide function.

<Presentation Example of an Operation Guide Relating to the Insertion Section in the Second Embodiment>

Subsequently, a presentation example of an operation guide relating to the insertion section in the second embodiment is explained.

FIG. 7 to FIG. 12 are explanatory diagrams showing presentation examples of "a temporally different plurality of kinds of operation guide" relating to the insertion section presented to the surgeon in a state in which the distal end portion of the insertion section faces a folded lumen.

When the lumen 81 is displayed in an endoscopic image displayed on the monitor 5 shown in FIG. 7 and when the folded lumen 82 is located in a position that the distal end portion 7 of the insertion section 6 faces, for example, operation guide display 61 is presented on the screen of the monitor 5 based on the plurality of kinds of operation information calculated by the plurality-of-kinds-of-operation-information calculating unit 32.

The operation guide display 61 is a guide showing a temporally different plurality of kinds of operation in time series when performing advancing operation of the distal end portion 7 of the insertion section 6 with respect to the folded lumen 82. In the second embodiment, the operation guide display 61 is arrow display obtained by combining the first operation guide display 61*a* corresponding to the substantially straight advancing direction operation in the first stage and the second operation guide display 61*b* corresponding to the bending direction operation in the second stage after the distal end portion 7 of the insertion section 6 slips through the folded lumen 82 after the substantially straight advancing direction operation in the first stage.

The operation guide display 61 is configured by user interface design with which the surgeon viewing the guide display can intuitively recognize that the advancing operation in the two stages (a plurality of stages) explained above is desirable. For example, the operation guide display 61 includes a characteristic taper curve from the arrow root portion of the first operation guide display 61*a* to the arrow distal end portion of the second operation guide display 61*b* or contrivance for displaying the operation guide display 61 in gradation is performed.

Figure 8:
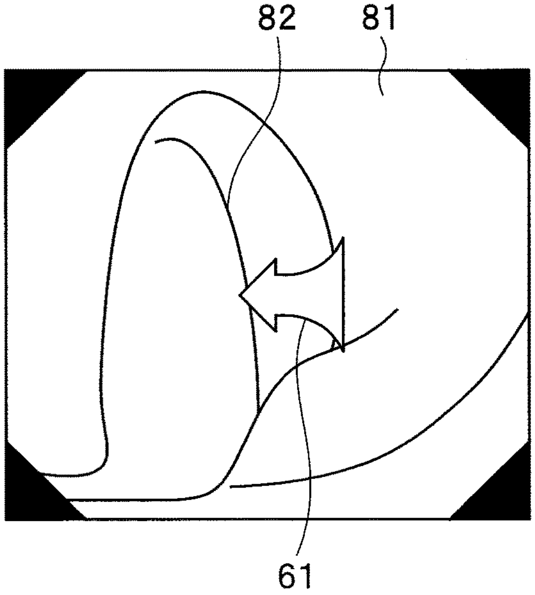
FIG. 8 is an explanatory diagram showing another presentation example of "a temporally different plurality of kinds of operation guide" relating to the insertion section presented to the surgeon in the state in which the distal end portion of the insertion section faces the folded lumen in the movement support system in the second embodiment.

Note that in the second embodiment, the operation guide display 61 assumes an arrow shape outside a frame of an endoscopic image. However, the operation guide display 61 is not limited to this and, for example, as shown in FIG. 8, may be displayed near the folded lumen 82 in the endoscopic image.

Figure 9:
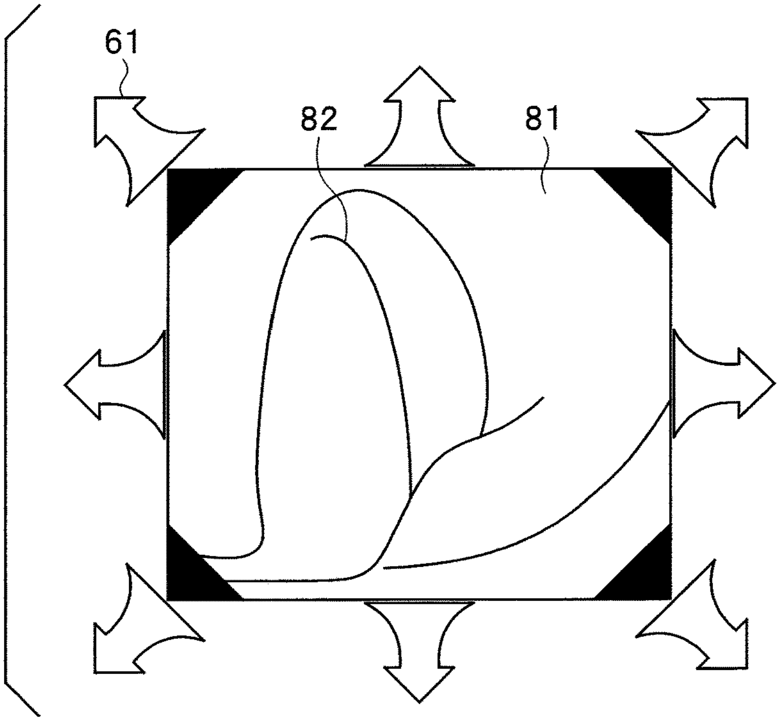
FIG. 9 is an explanatory diagram showing another presentation example of "a temporally different plurality of kinds of operation guide" relating to the insertion section presented to the surgeon in the state in which the distal end portion of the insertion section faces the folded lumen in the movement support system in the second embodiment.

The operation guide display 61 may be another sign or icon if the sign or the icon is notation with which the surgeon can intuitively recognize the advancing operation in the plurality of stages. The direction of the arrow in FIG. 7 may be displayed in any one of multiple directions, for example, eight directions as shown in FIG. 9.

Figure 11:
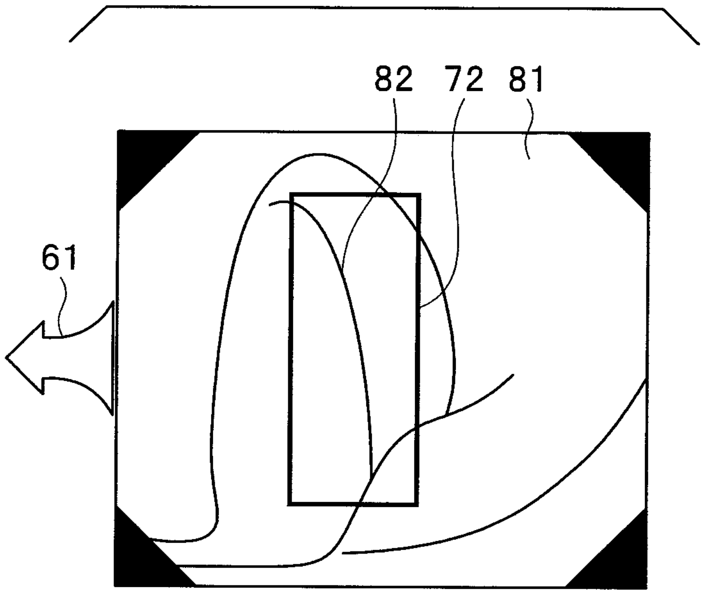
FIG. 11 is an explanatory diagram showing an example of information added to the presentation information of "a temporally different plurality of kinds of operation guide" related to the insertion section presented to the surgeon in the state in which the distal end portion of the insertion section faces the folded lumen in the movement support system in the second embodiment.
Figure 12:
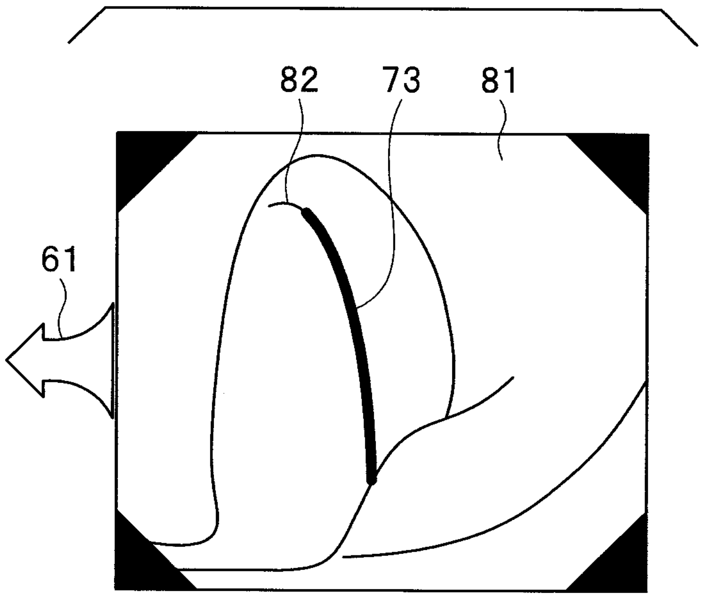
FIG. 12 is an explanatory diagram showing an example of information added to the presentation information of "a temporally different plurality of kinds of operation guide" related to the insertion section presented to the surgeon in the state in which the distal end portion of the insertion section faces the folded lumen in the movement support system in the second embodiment.

Further, in order to clearly show a position of the folded lumen 82, the folded lumen 82 may be covered by a surrounding line 72 as shown in FIG. 11 or may be emphasized by a thick line 73 as shown in FIG. 12. A position of the folded lumen 82 in an image is also detected based on a learning model obtained using an approach by machine learning or the like or using an approach of detecting a feature value in the processing of the scene detecting unit 35 and the position of the folded lumen 82 is displayed based on a result of the detection.

On the other hand, when it is determined in step S4 explained above that the likelihood explained above is lower than the threshold and the accuracy (the likelihood) of the presentation result is low, as shown in FIG. 10, the presentation-information generating unit 34 may present to the effect that the accuracy of the presentation result is low (a sign 71).

Figure 13:
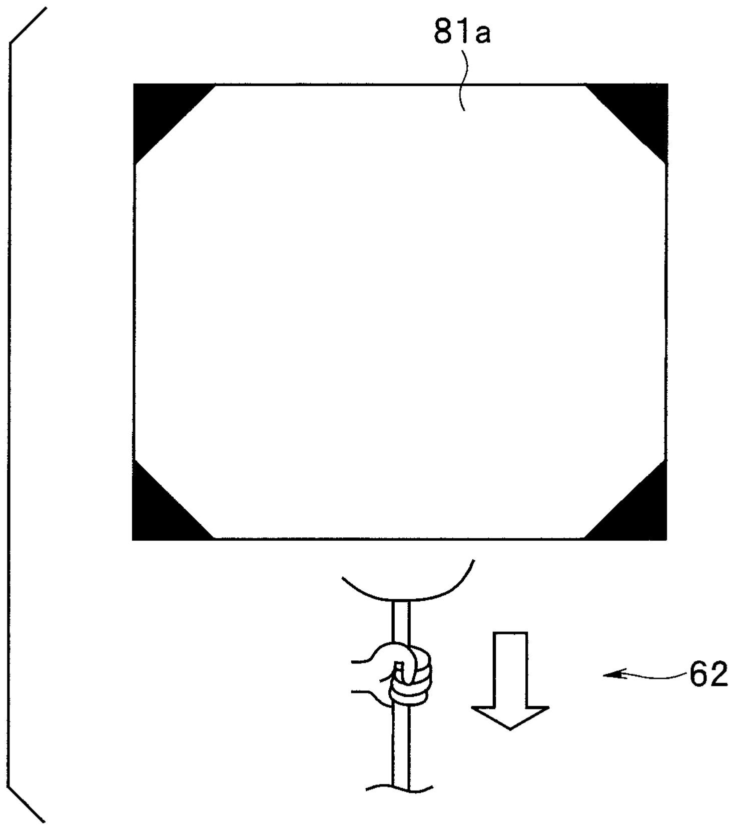
FIG. 13 is an explanatory diagram showing a presentation example of "an operation guide relating to an insertion section" presented to the surgeon in a state in which a distal end portion of the insertion section is pressed into an intestinal wall in the movement support system in the second embodiment.

FIG. 13 to FIG. 14 are explanatory diagrams showing presentation examples of "an operation guide relating to an insertion section" presented to the surgeon in a state in which the distal end portion of the insertion section is pressed into an intestinal wall in the movement support system in the second embodiment.

When the scene detected by the scene detecting unit 35 is "pressing into an intestinal wall" in step S2 explained above, when inserting operation of the folded lumen is not being performed and the likelihood of the scene detected by the scene detecting unit 35 explained above is equal to or higher than the threshold (step S9), it is likely that the distal end portion 7 of the insertion section 6 is pressed into the intestine and a burden is imposed on the patient. Therefore, as shown in FIG. 13, a guide 62 for pulling operation of the insertion section 6 is presented outside a frame in which a lumen 81*a* is displayed.

On the other hand, when it is determined in step S9 that the likelihood explained above is lower than the threshold and the accuracy (the likelihood) of the presentation result is low, as shown in FIG. 14, the presentation-information generating unit 34 presents to the effect that the accuracy of the presentation result is low (the sign 71).

FIG. 15 to FIG. 16 are explanatory diagrams showing presentation example of "an operation guide relating to an insertion section" presented to the surgeon when a diverticulum is found in the movement support system in the second embodiment.

When the scene detected by the scene detecting unit 35 is the "diverticulum" in step S2 explained above and when likelihood of the detected scene is equal to or higher than a threshold (step S12), it is likely that the distal end portion 7 of the insertion section 6 is inserted into a diverticulum 83 by mistake. Therefore, as shown in FIG. 15, presence and a position of the diverticulum are emphasized by a broken line 75 or the like in a frame in which a lumen 81*b* is displayed and attention is called outside the frame in which the lumen 81*b* is displayed (a sign 74). A position of the diverticulum in an image is also detected based on a learning model obtained using an approach by machine learning or the like or using an approach of detecting a feature value in the processing of the scene detecting unit 35 and the position of the diverticulum is displayed based on a result of the detection.

On the other hand, when it is determined in step S12 that the likelihood explained above is lower than the threshold and the accuracy (the likelihood) of the presentation result is low, as shown in FIG. 16, as explained above, the presentation-information generating unit 34 presents to the effect that the accuracy of the presentation result is low (the sign 71).

Effects of the Second Embodiment

In the movement support system in the second embodiment, according to various scenes, guide information for advancing operation of the distal end portion of the insertion section that can be taken thereafter can be accurately presented to the surgeon performing the endoscope operation. By performing a presentation arithmetic operation for the guide information corresponding to the scenes, accuracy is also improved.

By presenting the guide information for the advancing operation for a scene in which pressing into an intestine is performed or a scene in which a diverticulum is present, safety of inserting operation is improved.

Third Embodiment

Subsequently, a third embodiment of the present invention is explained.

Compared with the second embodiment, a movement support system in a third embodiment includes a recording unit in the video processor 3, records a scene detected by the scene detecting unit 35 and/or a plurality of kinds of operation information calculated by the plurality-of-kinds-of-operation-information calculating unit 32, and, for example, when a lumen direction in which the distal end portion of the insertion section should proceed is lost sight of, makes it possible to generate presentation information for an operation guide relating to the insertion section 6 using information in the past recorded in the recording unit.

Since the other components are the same as the components in the first embodiment or the second embodiment, only the differences from the first embodiment or the second embodiment are explained. Explanation about common portions is omitted.

Figure 17:
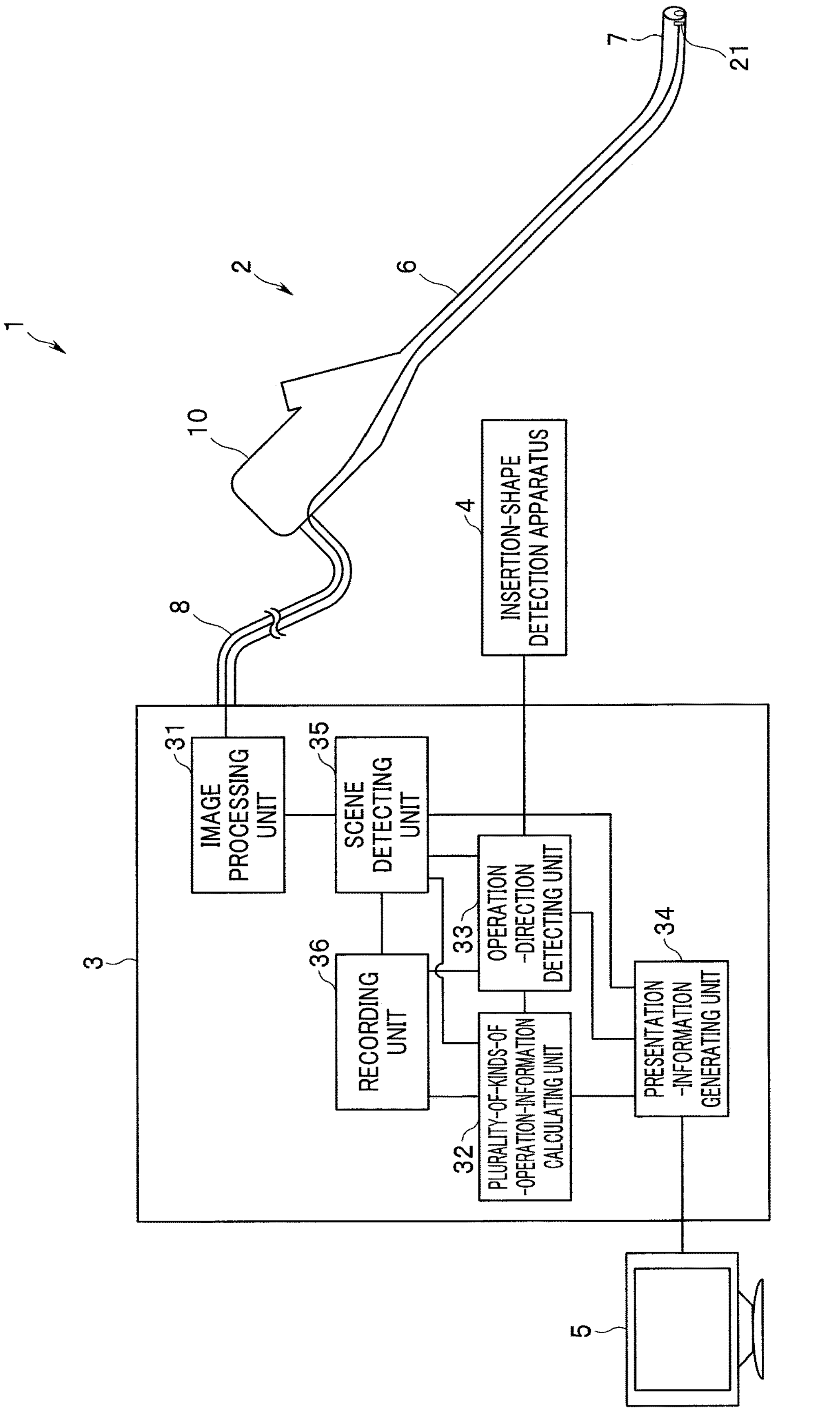
FIG. 17 is a block diagram showing a configuration of an endoscope system including a movement support system according to a third embodiment of the present invention.
Figure 18:
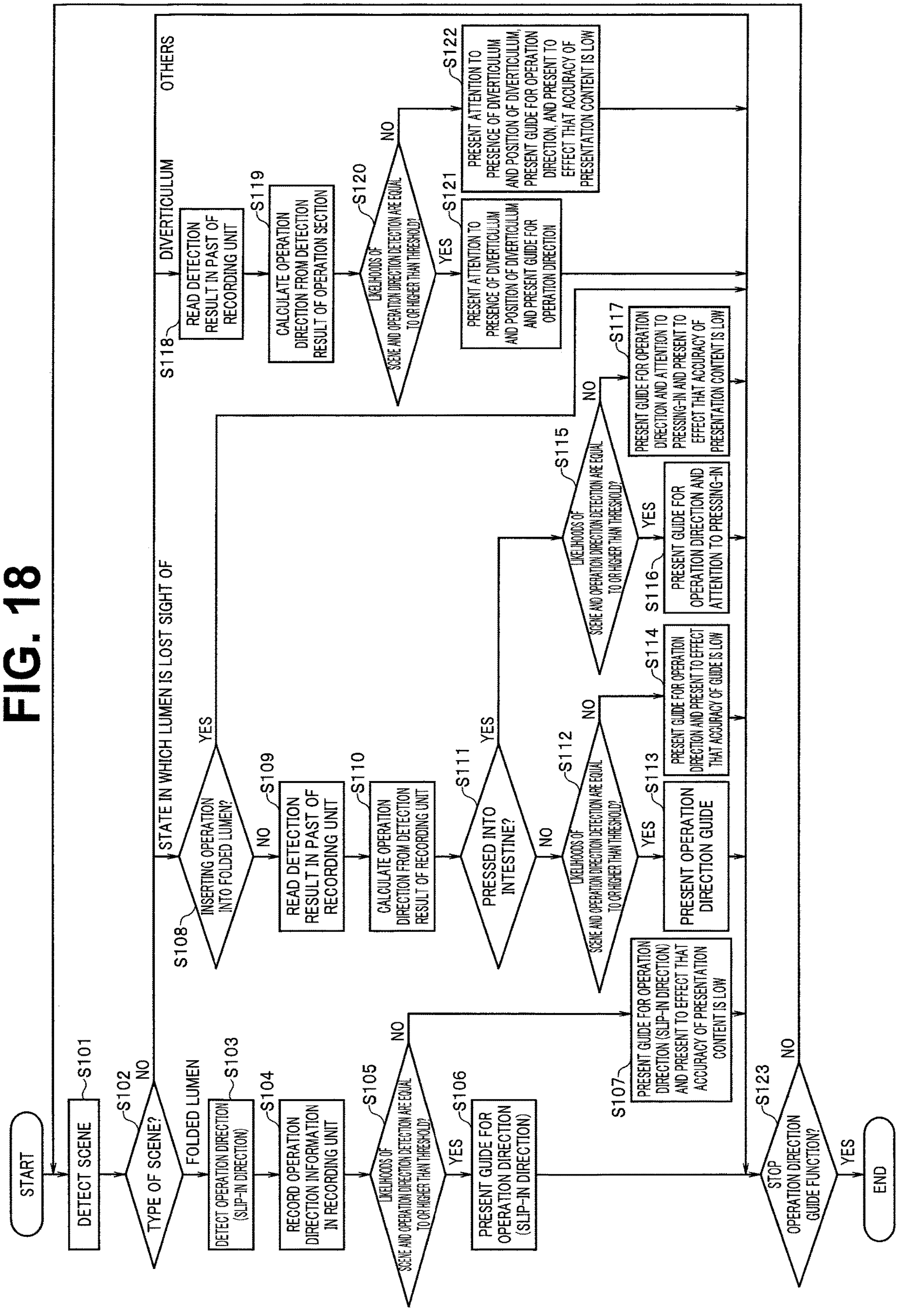
FIG. 18 is a flowchart showing action of a scene detecting unit, a presentation-information generating unit, and a recording unit in the movement support system in the third embodiment.

FIG. 17 is a block diagram showing a configuration of an endoscope system including a movement support system according to the third embodiment of the present invention. FIG. 18 is a flowchart showing action of a scene detecting unit, a presentation-information generating unit, and a recording unit in the movement support system in the third embodiment.

As shown in FIG. 17, as in the first embodiment, the endoscope system 1 according to the third embodiment mainly includes the endoscope 2, the not-shown light source apparatus, the video processor 3, the insertion-shape detection apparatus 4, and the monitor 5.

The endoscope 2 forms the same configuration as the configuration in the first embodiment. The insertion section 6 is configured by providing the rigid distal end portion 7, a bendably formed bending section, and a long flexible tube section having flexibility in order from a distal end side.

In the distal end portion 7, the image pickup unit 21 configured to perform an operation corresponding to an image pickup control signal supplied from the video processor 3 and pick up an image of an object illuminated by illumination light emitted through an illumination window and output an image pickup signal is provided. The image pickup unit 21 includes an image sensor such as a CMOS image sensor or a CCD image sensor.

In the third embodiment, the video processor 3 includes a control unit that manages control of respective circuits in the video processor 3 and includes a recording unit 36 besides the image processing unit 31, the plurality-of-kinds-of-operation-information calculating unit 32, the operation-direction detecting unit 33, the presentation-information generating unit 34, and the scene detecting unit 35.

As in the first embodiment, the image processing unit 31 is configured to acquire an image pickup signal outputted from the endoscope 2, apply predetermined image processing to the image pickup signal to generate a time-series endoscopic image, and perform a predetermined operation for causing the monitor 5 to display the endoscopic image generated by the image processing unit 31.

As in the second embodiment, the scene detecting unit 35 classifies a state of the endoscopic image based on a picked-up image from the image processing unit 31 using an approach by machine learning or an approach of detecting a feature value.

Types of classifications are, for example, a "folded lumen", "pressing into an intestinal wall", a "diverticulum", and others (a state in which a guide is unnecessary such as a normal lumen).

The recording unit 36 is capable of recording a scene detected by the scene detecting unit 35 and/or a plurality of kinds of operation information calculated by the plurality-of-kinds-of-operation-information calculating unit 32. For example, when a lumen is lost sight of, the recording unit 36 makes it possible to generate presentation information for an operation guide relating to the insertion section 6 using information in the past recorded in the recording unit.

Action of the Third Embodiment

Subsequently, action of an image recording apparatus in the third embodiment is explained with reference to a flowchart of FIG. 18.

When the video processor 3 in the movement support system in the third embodiment starts operation, as in the second embodiment, first, the scene detecting unit 35 detects a scene (an image pickup scene) (step S101).

On the other hand, the recording unit 36 starts recording of a scene detected by the scene detecting unit 35 and/or a plurality of kinds of operation information calculated by the plurality-of-kinds-of-operation-information calculating unit 32.

When a state in which a surgeon fails in insertion of the distal end portion 7 of the insertion section 6 into the folded lumen 82 and loses sight of a lumen occurs because of some cause, the scene detecting unit 35 detects a movement of the distal end portion 7 from a scene in which the lumen is lost sight of and records the movement in the recording unit 36. For the detection of the movement, for example, an approach by machine learning or an approach (an optical flow) of detecting a change in a feature point is used for an image. In a configuration including the insertion-shape detection apparatus 4, a movement of a distal end portion of an insertion section may be detected from the insertion-shape detection apparatus 4.

Referring back to step S102, as in the second embodiment, the plurality-of-kinds-of-operation-information calculating unit 32 performs an arithmetic operation corresponding to a type of the scene detected by the scene detecting unit (step S102).

When the scene detecting unit 35 detects a scene in which presentation of an advancing operation guide for the insertion section is unnecessary (when the scene is classified into the "others" explained above), the plurality-of-kinds-of-operation-information calculating unit 32 does not perform an arithmetic operation of an operation direction. Accordingly, presentation of operation is not performed either. Consequently, it is possible to reduce possibility of unnecessary presentation to be performed. In other words, accuracy of presentation information can be improved. By not performing unnecessary presentation on the monitor 5, visibility of the monitor 5 for the surgeon can be improved.

On the other hand, when the scene is the "folded lumen" in step S102, the scene detecting unit 35 detects, with the approach by machine learning or the approach of detecting a feature value explained above, a direction for causing the distal end portion 7 of the insertion section 6 to slip into the folded lumen (step S103). The scene detecting unit 35 records, in the recording unit 36, operation direction information concerning the direction for causing the distal end portion 7 of the insertion section 6 to slip into the folded lumen (step S104).

In the following explanation, in FIG. 18, action of step S105 to step S107 is the same as the action of step S4 to step S6 in the second embodiment. Therefore, explanation of the action is omitted.

A case is explained in which, in step S102, the scene detecting unit 35 detects that the scene is the scene in which "a lumen is lost sight of" explained above. During insertion into the folded lumen, in some case, the distal end portion 7 of the insertion section 6 is brought into contact with the intestinal wall or the distal end portion 7 of the insertion section 6 is inserted while being pressed with a weak force with less risk for the intestine. In that case, since the lumen is lost sight of as well, the scene detecting unit 35 determines that the surgeon is intentionally performing operation for losing sight of the lumen. Accordingly, even in the "a lumen is lost sight of" scene, the presentation-information generating unit 34 does not present anything when the insertion into the folded lumen is being performed (step S108).

On the other hand, when the insertion into the folded lumen is not being performed in step S108, the plurality-of-kinds-of-operation-information calculating unit 32 reads out the information recorded by the recording unit 36 (step S109) and calculates, based on movement information from the scene in which the lumen is lost sight of to the present, a direction in which the folded lumen 82 is present (step S110).

The plurality-of-kinds-of-operation-information calculating unit 32 further calculates an operation direction for causing the distal end portion 7 of the insertion section 6 to slip into the folded lumen before the folded lumen is lost sight of and displays, from the information recorded in the recording unit 36 (step S104), a state in which the folded lumen is lost sight of to operation for causing the distal end portion 7 of the insertion section 6 to slip into the folded lumen lost sight of in addition to the direction in which the folded lumen 82 is present (step S11 to step S114).

Further, when pressing into an intestine further occurs in the scene in which the lumen is lost sight of (step S11), the presentation-information generating unit 34 presents attention to the pressing-in as well (step S115 to step S117).

When the scene detected by the scene detecting unit 35 is the "diverticulum" in step S102, the plurality-of-kinds-of-operation-information calculating unit 32 reads out the information recorded by the recording unit 36 (step S118) and calculates an operation direction from the detection result of the operation section (step S119).

Further, when likelihood of the scene detected by the scene detecting unit 35 and likelihood of the operation direction calculated by the plurality-of-kinds-of-operation-information calculating unit 32 are equal to or higher than a threshold (step S120), it is likely that the distal end portion 7 of the insertion section 6 is inserted into a diverticulum by mistake. Therefore, the presentation-information generating unit 34 presents presence and a position of the diverticulum (step S121).

Alternatively, when it is determined that the likelihoods are lower than the threshold and accuracy (likelihood) of a presentation result is low, as explained above, the presentation-information generating unit 34 presents to the effect that the accuracy of the presentation result is low (step S122).

Thereafter, the video processor 3 determines whether to stop an inserting direction guide function (step S123) and, when continuing the inserting direction guide function, repeats the processing. Note that the surgeon may instruct a stop of the inserting direction guide function with a predetermined input apparatus or the scene detecting unit 35 may be able to detect an intestinal cecum from a picked-up image outputted from the image processing unit 31 and, when detecting that the distal end portion 7 of the insertion section 6 reaches the intestinal cecum, determine to stop the inserting direction guide function.

<Presentation Example of an Operation Guide Relating to the Insertion Section in the Third Embodiment>

Subsequently, a presentation example of an operation guide relating to the insertion section in the third embodiment is explained.

Figure 19:
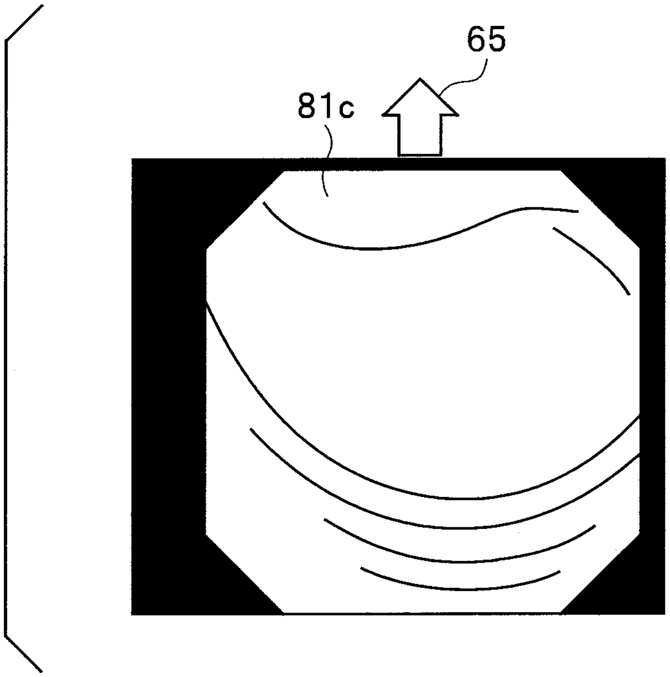
FIG. 19 is an explanatory diagram showing a presentation example of "an operation guide relating to an insertion section" presented to a surgeon in a state in which a lumen direction in which a distal end portion of an insertion section should proceed is lost sight of in the movement support system in the third embodiment.
Figure 20:
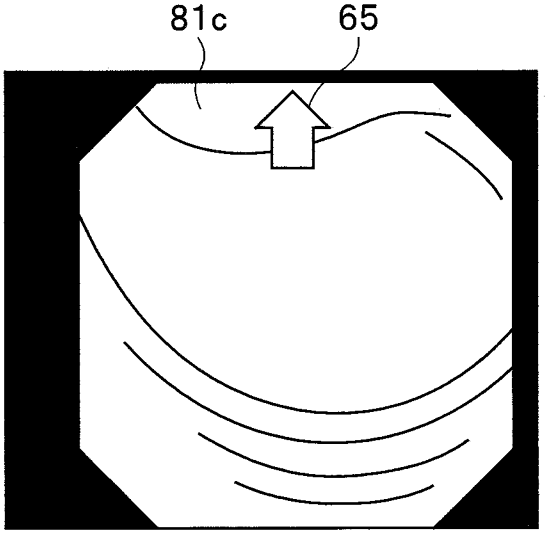
FIG. 20 is an explanatory diagram showing another presentation example of "an operation guide relating to an insertion section" presented to the surgeon in the state in which the lumen direction in which the distal end portion of the insertion section should proceed is lost sight of in the movement support system in the third embodiment.

FIG. 19 to FIG. 20 are explanatory diagrams showing presentation examples of "an operation guide relating to an insertion section" presented to the surgeon in a state in which a lumen direction in which the distal end portion of the insertion section should proceed is lost sight of in the movement support system in the third embodiment.

When a lumen 81*c* is displayed in a state in which a lumen direction in which the distal end portion of the insertion section should proceed is lost sight of in an endoscopic image displayed on the monitor 5 shown in FIG. 19, the presentation-information generating unit 34 presents, based on the information recorded in the recording unit 36, operation guide display 65 indicating a direction in which the distal end portion of the insertion section should proceed.

Note that in the third embodiment, the operation guide display 65 assumes an arrow shape outside a frame of the endoscopic image. However, the operation guide display 65 is not limited to this and may be displayed inside the endoscopic image, for example, as shown in FIG. 20.

Effects of the Third Embodiment

In the movement support system in the third embodiment, the recording unit 36 records the scene detected by the scene detecting unit 35 and/or the plurality of kinds of operation information calculated by the plurality-of-kinds-of-operation-information calculating unit 32 to make it possible to, for example, even when a lumen direction in which the distal end portion of the insertion section should proceed is lost sight of, generate presentation information for an operation guide relating to the insertion section 6 using information in the past recorded in the recording unit 36.

Subsequently, in the movement support system in the second and third embodiments, display examples of operation guide display in a scene in which a temporally different plurality of kinds of operation are necessary are illustrated and explained for each of scenes.

Figure 21:
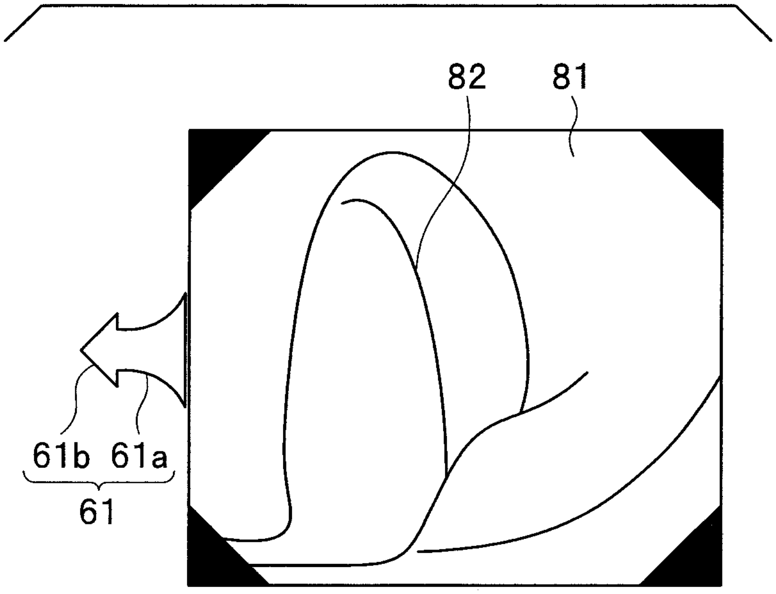
FIG. 21 is an explanatory diagram showing a presentation example of "a temporally different plurality of kinds of operation guide" relating to the insertion section presented to the surgeon in a state in which a folded lumen is in front of the distal end portion of the insertion section in the movement support system in the second and third embodiments.
Figure 22:
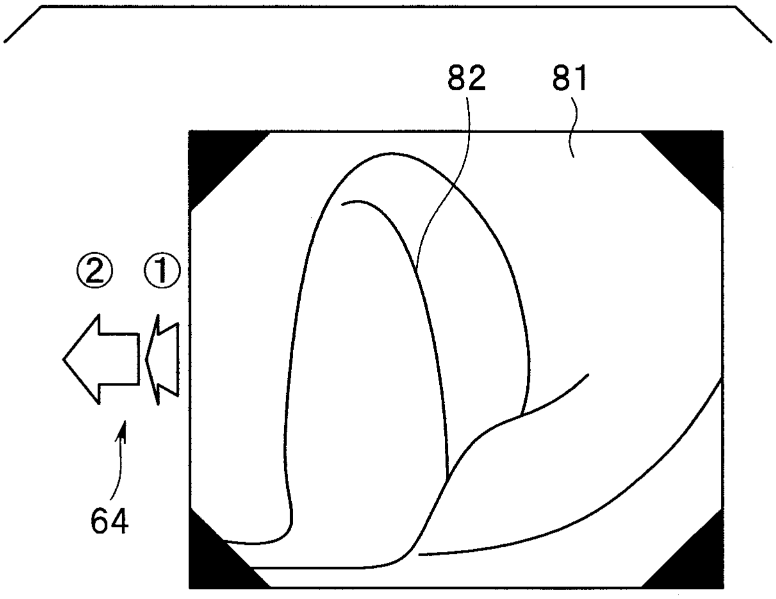
FIG. 22 is an explanatory diagram showing another presentation example of "a temporally different plurality of kinds of operation guide" relating to the insertion section presented to the surgeon in the state in which the folded lumen is in front of the distal end portion of the insertion section in the movement support system in the second and third embodiments.

FIG. 21 to FIG. 22 are explanatory diagrams showing presentation examples of "a temporally different plurality of kinds of operation guide" relating to the insertion section presented to the surgeon in a state in which a folded lumen is in front.

Like the operation guide display 61 explained above, an example shown in FIG. 21 is a guide showing a temporally different plurality of kinds of operation in time series in advancing operation of the distal end portion 7 of the insertion section 6 with respect to the folded lumen 82 and is an arrow display obtained by combining the first operation guide display 61*a* corresponding to a substantially straight advancing direction operation in a first stage and the second operation guide display 61*b* corresponding to a bending direction operation in a second stage after the distal end portion 7 of the insertion section 6 slips through the folded lumen 82 after the substantially straight advancing direction operation in the first stage.

Like the operation guide display 61, operation guide display 64 shown in FIG. 22 is a guide showing a temporally different plurality of kinds of operation in time series but is an example in which display corresponding to the substantially straight advancing direction operation in the first stage and display corresponding to the bending direction operation in the second stage after the distal end portion 7 of the insertion section 6 slips through the folded lumen 82 are separately shown. Numbers indicating order of operation are given.

Figure 23:
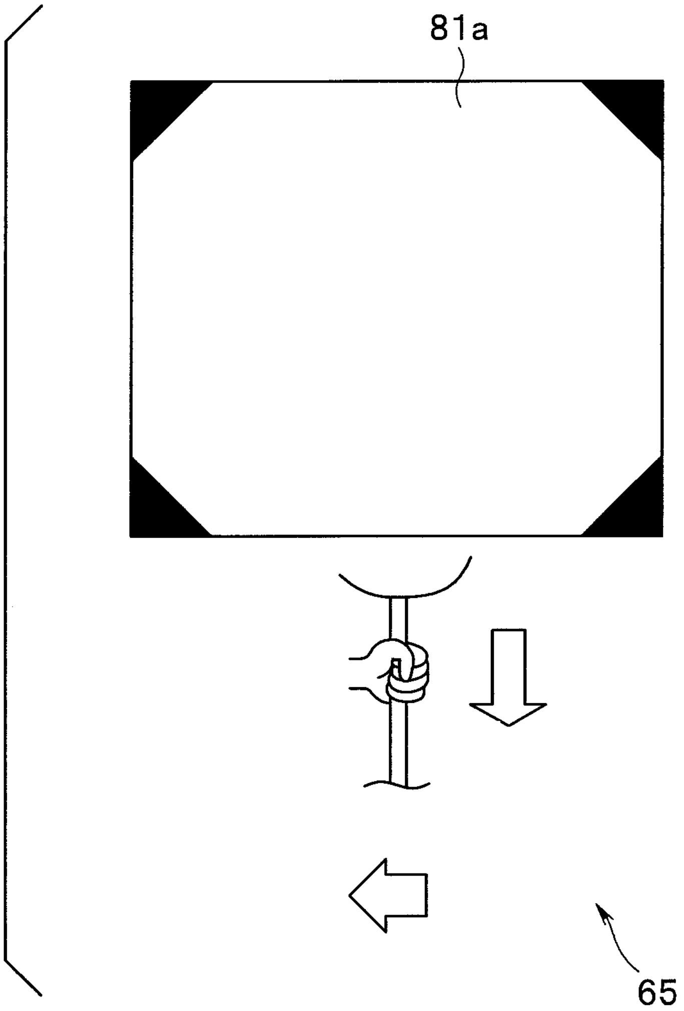
FIG. 23 is an explanatory diagram showing a presentation example of "a temporally different plurality of kinds of operation guide" relating to the insertion section presented to the surgeon in a state in which the distal end portion of the insertion section is pressed into an intestinal wall in the movement support system in the second and third embodiments.

FIG. 23 is an explanatory diagram showing a presentation example of "a temporally different plurality of kinds of operation guide" relating to the insertion section presented to the surgeon in a state in which the distal end portion of the insertion section is pressed into an intestinal wall in the movement support system in the second and third embodiments.

Operation guide display 65 shown in FIG. 23 shows, as separate arrows, a plurality of kinds of operation (pulling operation of the insertion section 6), times of which are different, in time series outside a frame in which the lumen 81*a* is displayed in a state in which the distal end portion of the insertion section is pressed into an intestinal wall and is an example in which, after the pulling operation is performed as indicated by the arrows and a figure of the pulling operation, a lumen is present on a left side as indicated by a leftward arrow, that is, direction operation in a left direction is presented.

Figure 24:
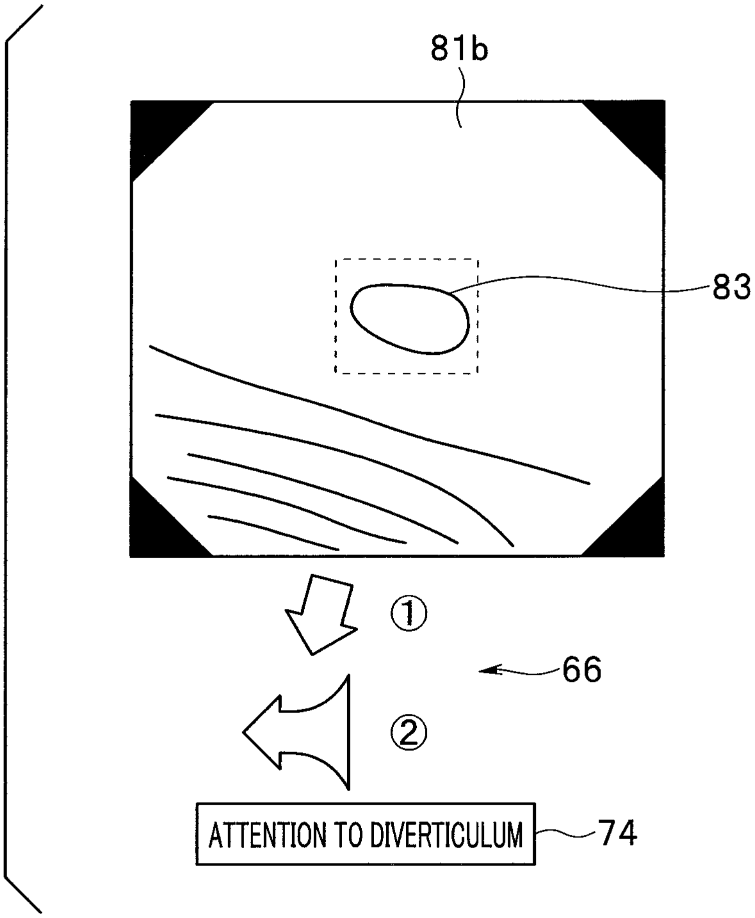
FIG. 24 is an explanatory diagram showing a presentation example of "a temporally different plurality of kinds of operation guide" relating to the insertion section presented to the surgeon when a diverticulum is found in the movement support system in the second and third embodiments.

FIG. 24 is an explanatory diagram showing a presentation example of "a temporally different plurality of kinds of operation guide" relating to the inserting section presented to the surgeon when a diverticulum is found in the movement support system in the second and third embodiments.

Guide display 66 shown in FIG. 24 shows, as separate arrows, a plurality of kinds of operation (advancing operation directions of the distal end portion 7 of the insertion section 6), times of which are different, in time series together with a position of a diverticulum and display of attention calling. In this example, order of operation is indicated by numbers such as (1) and (2). The guide display 66 indicates that a folded lumen is found by operating a direction to an arrow of (1) and the distal end portion 7 of the insertion section 6 can pass through the folded lumen by being caused to slip into a left side indicated by an arrow of (2).

Figure 25:
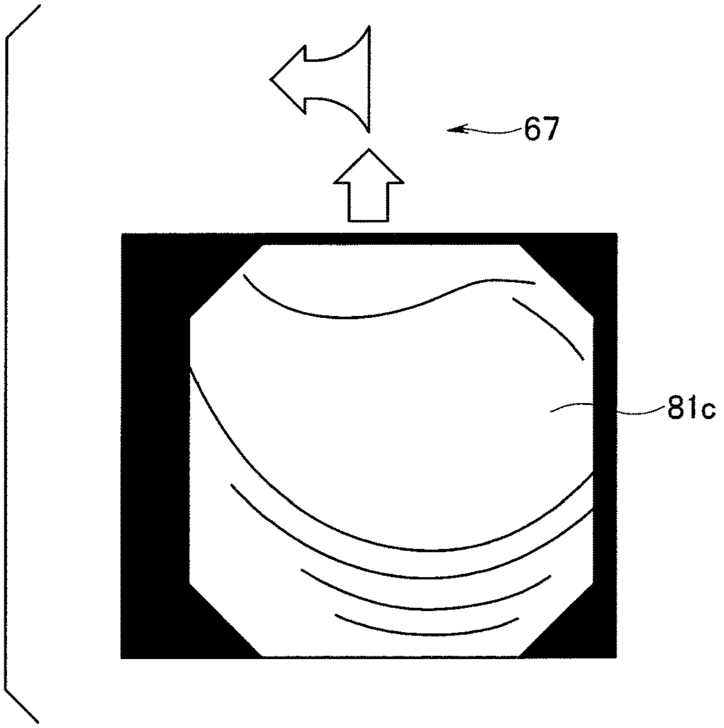
FIG. 25 is an explanatory diagram showing a presentation example of "a temporally different plurality of kinds of operation guide" relating to the insertion section presented to the surgeon in a state in which a lumen direction in which the distal end portion of the insertion section should proceed is lost sight of in the movement support system in the third embodiment.

FIG. 25 is an explanatory diagram showing a presentation example of "a temporally different plurality of kinds of operation guide" relating to the insertion section presented to the surgeon in a state in which a lumen direction in which the distal end portion of the insertion section should proceed is lost sight of in the movement support system in the third embodiment.

Guide display 67 shown in FIG. 25 shows, as separate arrows, a plurality of kinds of operation (advancing operation directions of the distal end portion 7 of the insertion section 6), times of which are different, in time series in a state in which a lumen direction in which the distal end portion of the insertion section should proceed is lost sight of. The guide display 67 indicates that a folded lumen is found in a direction of an upward arrow and the distal end portion 7 of the insertion section 6 can pass through the folded lumen by being caused to slip into a left side with respect to the found folded lumen.

Figure 26:
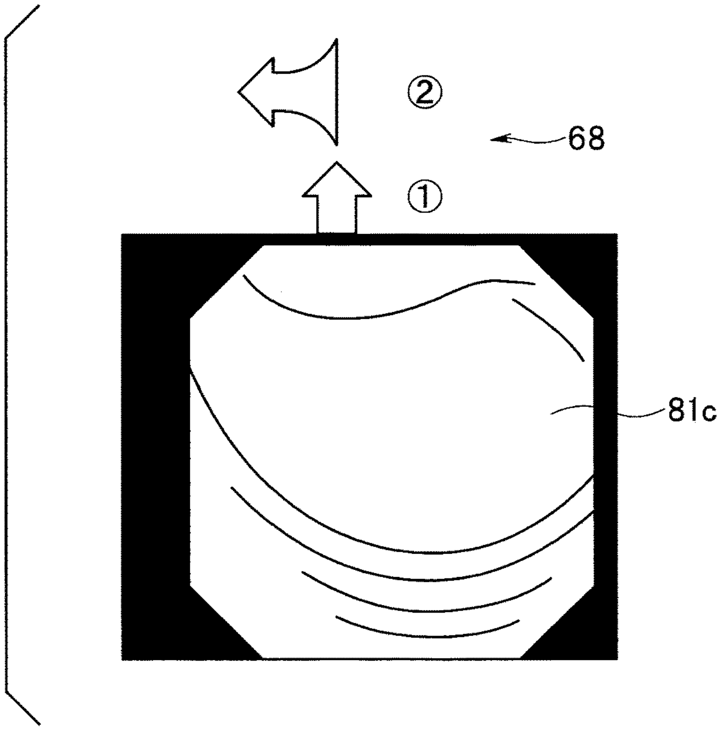
FIG. 26 is an explanatory diagram showing another presentation example of "a temporally different plurality of kinds of operation guide" relating to the insertion section presented to the surgeon in the state in which the lumen direction in which the distal end portion of the insertion section should proceed is lost sight of in the movement support system in the third embodiment.

FIG. 26 is an explanatory diagram showing another presentation example of "a temporally different plurality of kinds of operation guide" relating to the insertion section presented to the surgeon in a state in which a lumen direction in which the distal end portion of the insertion section should proceed is lost sight of in the movement support system in the third embodiment Guide display 68 shown in FIG. 26 shows, as separate arrows, a plurality of kinds of operation (advancing operation directions of the distal end portion 7 of the insertion section 6), times of which are different, in time series in a state in which a lumen direction in which the distal end portion of the insertion section should proceed is lost sight of and gives numbers indicating order of operation.

Figure 27A:
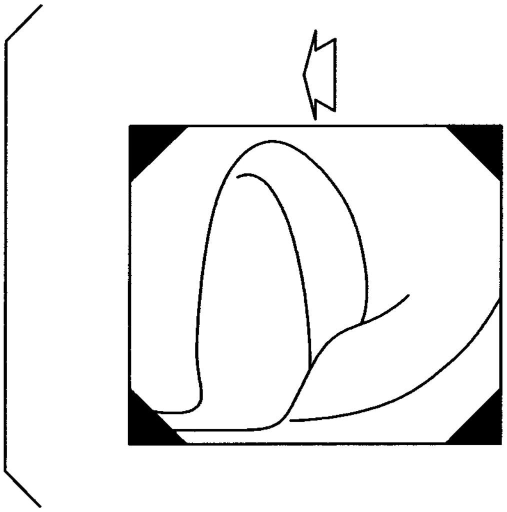
FIG. 27A is an explanatory diagram showing a presentation example in which "a temporally different plurality of kinds of operation guide" relating to the insertion section presented to the surgeon in the state in which the folded lumen is in front of the distal end portion of the insertion section is displayed as an animation in the movement support system in the second and third embodiments.
Figure 27B:
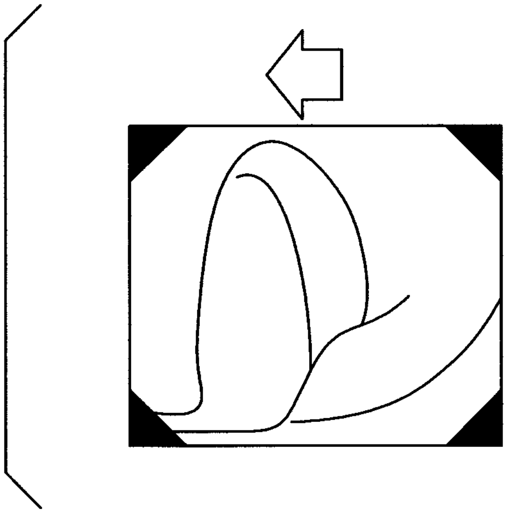
FIG. 27B is an explanatory diagram showing the presentation example in which "a temporally different plurality of kinds of operation guide" relating to the insertion section presented to the surgeon in the state in which the folded lumen is in front of the distal end portion of the insertion section is displayed as the animation in the movement support system in the second and third embodiments.

FIG. 27A and FIG. 27B are explanatory diagrams showing a presentation example in which "a temporally different plurality of kinds of operation guide" relating to the insertion section presented to the surgeon in a state in which the distal end portion of the insertion section faces a folded lumen is displayed as an animation in the movement support system in the second and third embodiments. FIG. 27A and FIG. 27B change in order to be displayed to indicate that the distal end portion 7 of the insertion section 6 is caused to slip into a left side after being inserted into the folded lumen.

Figure 28A:
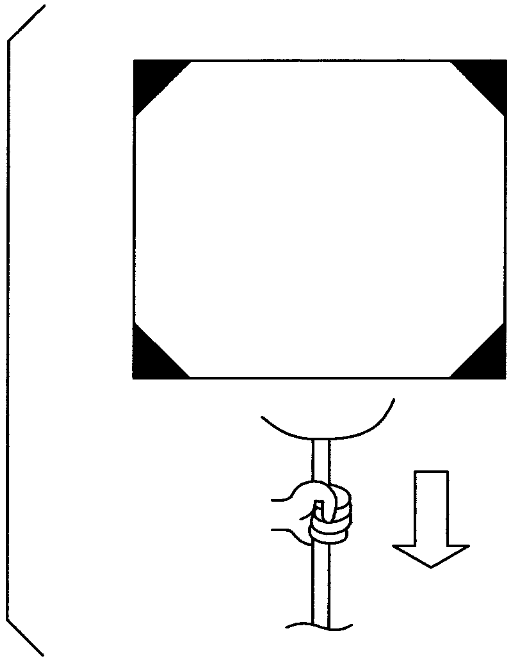
FIG. 28A is an explanatory diagram showing a presentation example in which "a temporally different plurality of kinds of operation guide" relating to the insertion section presented to the surgeon in the state in which the distal end portion of the insertion section is pressed into the intestinal wall is displayed as an animation in the movement support system in the second and third embodiments.
Figure 28B:
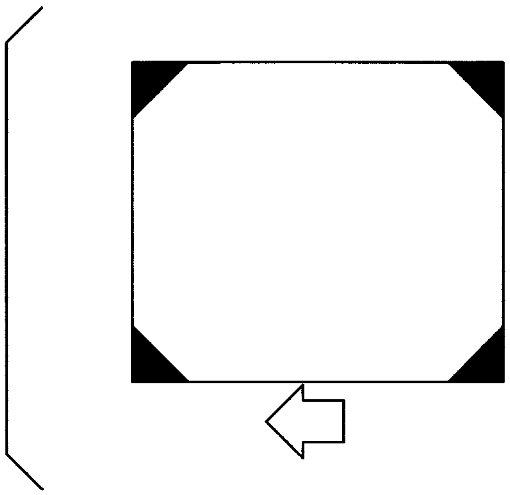
FIG. 28B is an explanatory diagram showing the presentation example in which "a temporally different plurality of kinds of operation guide" relating to the insertion section presented to the surgeon in the state in which the distal end portion of the insertion section is pressed into the intestinal wall is displayed as the animation in the movement support system in the second and third embodiments.

FIG. 28A and FIG. 28B are explanatory diagrams showing a presentation example in which "a temporally different plurality of kinds of operation guide" relating to the insertion section presented to the surgeon in the state in which the distal end portion of the insertion section is pressed into an intestinal wall is displayed as an animation in the movement support system in the second and third embodiments. The presentation example is an example in which, after pulling operation is performed as indicated by an arrow and a figure of pulling operation in FIG. 28A, direction operation in a direction in which a lumen is present on a left side, that is, in a left direction as indicated by a leftward arrow in FIG. 28B is presented.

Figure 29A:
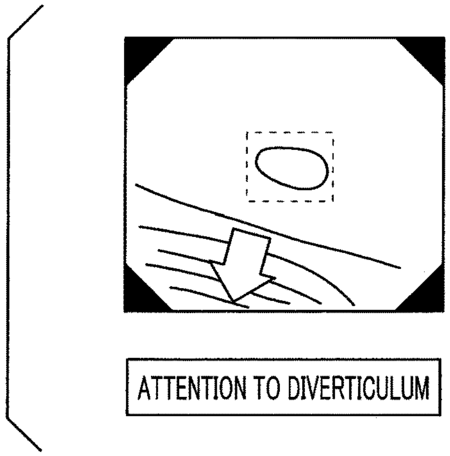
FIG. 29A is an explanatory diagram showing a presentation example in which "a temporally different plurality of kinds of operation guide" relating to the insertion section presented to the surgeon when a diverticulum is found is displayed as an animation in the movement support system in the second and third embodiments.
Figure 29B:
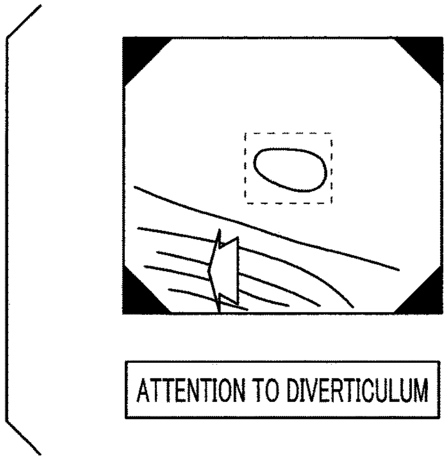
FIG. 29B is an explanatory diagram showing the presentation example in which "a temporally different plurality of kinds of operation guide" relating to the insertion section presented to the surgeon when the diverticulum is found is displayed as the animation in the movement support system in the second and third embodiments.
Figure 29C:
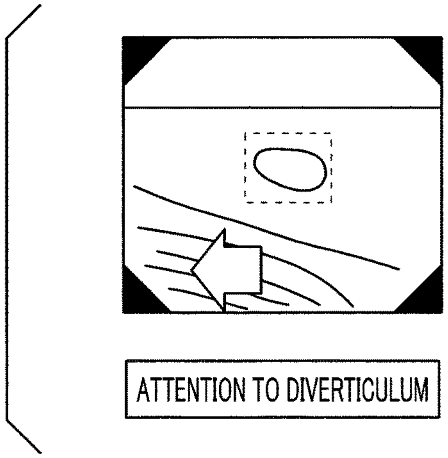
FIG. 29C is an explanatory diagram showing the presentation example in which "a temporally different plurality of kinds of operation guide" relating to the insertion section presented to the surgeon when the diverticulum is found is displayed as the animation in the movement support system in the second and third embodiments.

FIG. 29A, FIG. 29B, and FIG. 29C are explanatory diagrams showing a presentation example in which "a temporally different plurality of kinds of operation guide" relating to the insertion section presented to the surgeon when a diverticulum is found is displayed as an animation in the movement support system in the second and third embodiments. The presentation example indicates that a folded lumen is found by operating the distal end portion 7 of the insertion section 6 in a direction of an arrow in FIG. 29A and the distal end portion 7 of the insertion section 6 can pass through the folded lumen by being pressed into the found folded lumen as indicated by an arrow in FIG. 29B and caused to slip into a left side indicated by an arrow in FIG. 29C.

Figure 30A:
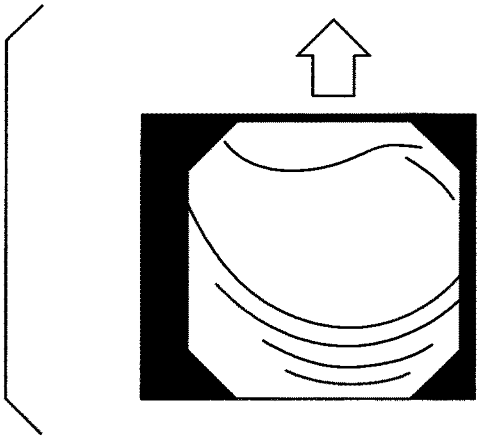
FIG. 30A is an explanatory diagram showing a presentation example in which "a temporally different plurality of kinds of operation guide" relating to the insertion section presented to the surgeon in a state in which the lumen direction in which the distal end portion of the insertion section should proceed is lost sight of is displayed as an animation in the movement support system in the third embodiment.
Figure 30B:
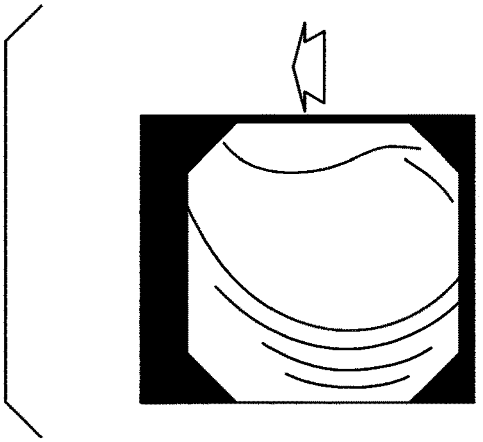
FIG. 30B is an explanatory diagram showing the presentation example in which "a temporally different plurality of kinds of operation guide" relating to the insertion section presented to the surgeon in the state in which the lumen direction in which the distal end portion of the insertion section should proceed is lost sight of is displayed as the animation in the movement support system in the third embodiment.
Figure 30C:
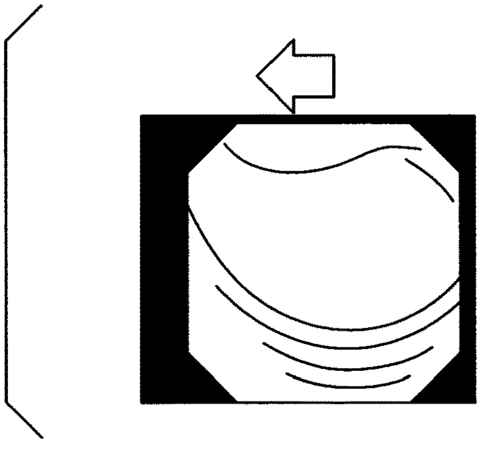
FIG. 30C is an explanatory diagram showing the presentation example in which "a temporally different plurality of kinds of operation guide" relating to the insertion section presented to the surgeon in the state in which the lumen direction in which the distal end portion of the insertion section should proceed is lost sight of is displayed as the animation in the movement support system in the third embodiment.

FIG. 30A, FIG. 30B, and FIG. 30C are explanatory diagrams showing a presentation example in which "a temporally different plurality of kinds of operation guide" relating to the insertion section presented to the surgeon in a state in which a lumen direction in which the distal end portion of the insertion section should proceed is lost sight of is displayed as an animation in the movement support system in the third embodiment. The presentation example indicates that a folded lumen is found in a direction of an upward arrow in FIG. 30A and the distal end portion 7 of the insertion section 6 can pass through the folded lumen by being pressed into the found folded lumen as indicated by an arrow in FIG. 30B and caused to slip into a left side in FIG. 30C.

Fourth Embodiment

Subsequently, a fourth embodiment of the present invention is explained.

Compared with the second embodiment, a movement support system in the fourth embodiment is characterized by including, in the video processor 3, a learning-data processing unit connected to a learning computer.

Since the other components are the same as the components in the first and second embodiments, only the differences from the first and second embodiments are explained. Explanation about common portions is omitted.

Figure 31:
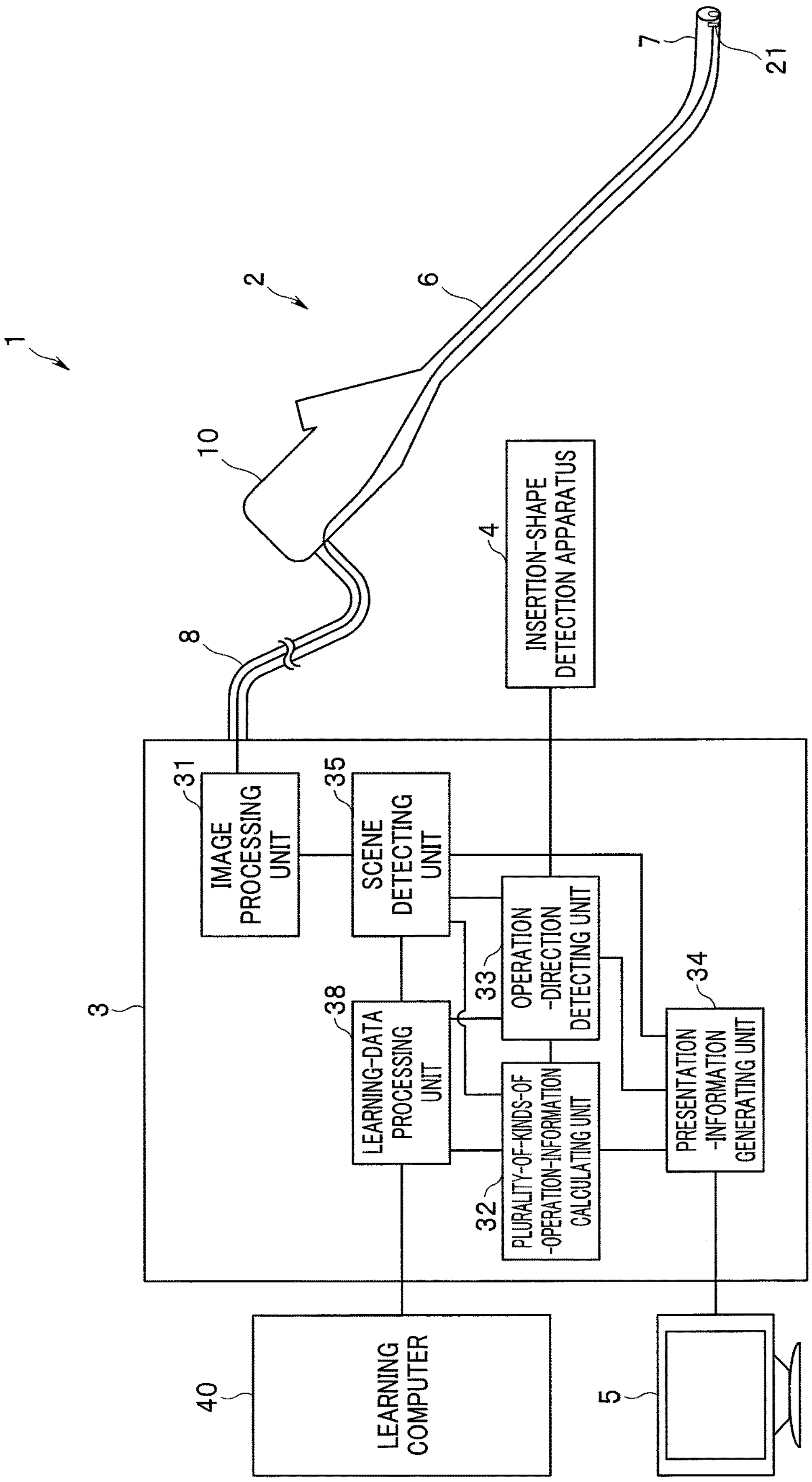
FIG. 31 is a block diagram showing a configuration of an endoscope system including a movement support system according to a fourth embodiment of the present invention.

FIG. 31 is a block diagram showing a configuration of an endoscope system including the movement support system according to the fourth embodiment of the present invention.

As shown in FIG. 31, as in the first embodiment, the endoscope system 1 according to the fourth embodiment mainly includes the endoscope 2, the not-shown light source apparatus, the video processor 3, the insertion-shape detection apparatus 4, the monitor 5, and a learning computer 40.

The endoscope 2 forms the same configuration as the configuration in the first embodiment. The insertion section 6 is configured by providing the rigid distal end portion 7, a bendably formed bending section, and a long flexible tube section having flexibility in order from a distal end side.

In the distal end portion 7, the image pickup unit 21 configured to perform an operation corresponding to an image pickup control signal supplied from the video processor 3 and pick up an image of an object illuminated by illumination light emitted through an illumination window and output an image pickup signal is provided. The image pickup unit 21 includes an image sensor such as a CMOS image sensor or a CCD image sensor.

In the fourth embodiment, the video processor 3 includes a control unit that manages control of respective circuits in the video processor 3 and includes a learning-data processing unit 38 connected to the learning computer 40 besides the image processing unit 31, the plurality-of-kinds-of-operation-information calculating unit 32, the operation-direction detecting unit 33, the presentation-information generating unit 34, and the scene detecting unit 35.

As in the first embodiment, the image processing unit 31 is configured to acquire an image pickup signal outputted from the endoscope 2, apply predetermined image processing to the image pickup signal to generate a time-series endoscopic image, and perform a predetermined operation for causing the monitor 5 to display the endoscopic image generated by the image processing unit 31.

The scene detecting unit 35 classifies a state of the endoscopic image based on a picked-up image from the image processing unit 31 using an approach by machine learning or an approach of detecting a feature value. Types of classifications are, for example, a "folded lumen", "pressing into an intestinal wall", a "diverticulum", and others (a state in which a guide is unnecessary such as a normal lumen).

The learning-data processing unit 38 is connected to the scene detecting unit 35, the operation-direction detecting unit 33, and the plurality-of-kinds-of-operation-information calculating unit 32. The learning-data processing unit 38 links and acquires image information used for detection in the approach of the machine learning in the scene detecting unit 35, the operation-direction detecting unit 33, and the plurality-of-kinds-of-operation-information calculating unit 32 and data of a detection result of the image information and transmits the image information and the data to the learning computer 40 as data being tested. The learning-data processing unit 38 may further include a function of deleting personal information from information transmitted to the learning computer 40. Consequently, it is possible to reduce possibility that the personal information leaks to an outside.

The learning computer 40 accumulates the data being tested received from the learning-data processing unit 38 and learns the data as teacher data. At this time, an annotator checks the teacher data and, if there is wrong teacher data, performs correct annotation and performs learning. Note that a learning result is processed by the learning-data processing unit 38. A detection model by machine learning of the scene detecting unit 35, the operation-direction detecting unit 33, and the plurality-of-kinds-of-operation-information calculating unit 32 is updated to contribute to performance improvement.

Note that in the fourth embodiment, the learning computer 40 is a component in the endoscope system 1. However, the learning computer 40 is not limited to this and may be configured on an outside via a predetermined network.

Fifth Embodiment

Subsequently, a fifth embodiment of the present invention is explained.

A movement support system 101 in the fifth embodiment executes, with a so-called automatic insertion apparatus, inserting operation of the insertion section 6 in the endoscope 2 forming the same configuration as the configuration in the first to fourth embodiments and is characterized by performing control of the automatic insertion apparatus with an output signal from the presentation-information generating unit 34 in the video processor 3.

Since a configuration of an endoscope system including the endoscope 2 is the same as the configuration in the first and second embodiments, only differences from the first and second embodiments are explained. Explanation about common portions is omitted.

Figure 32:
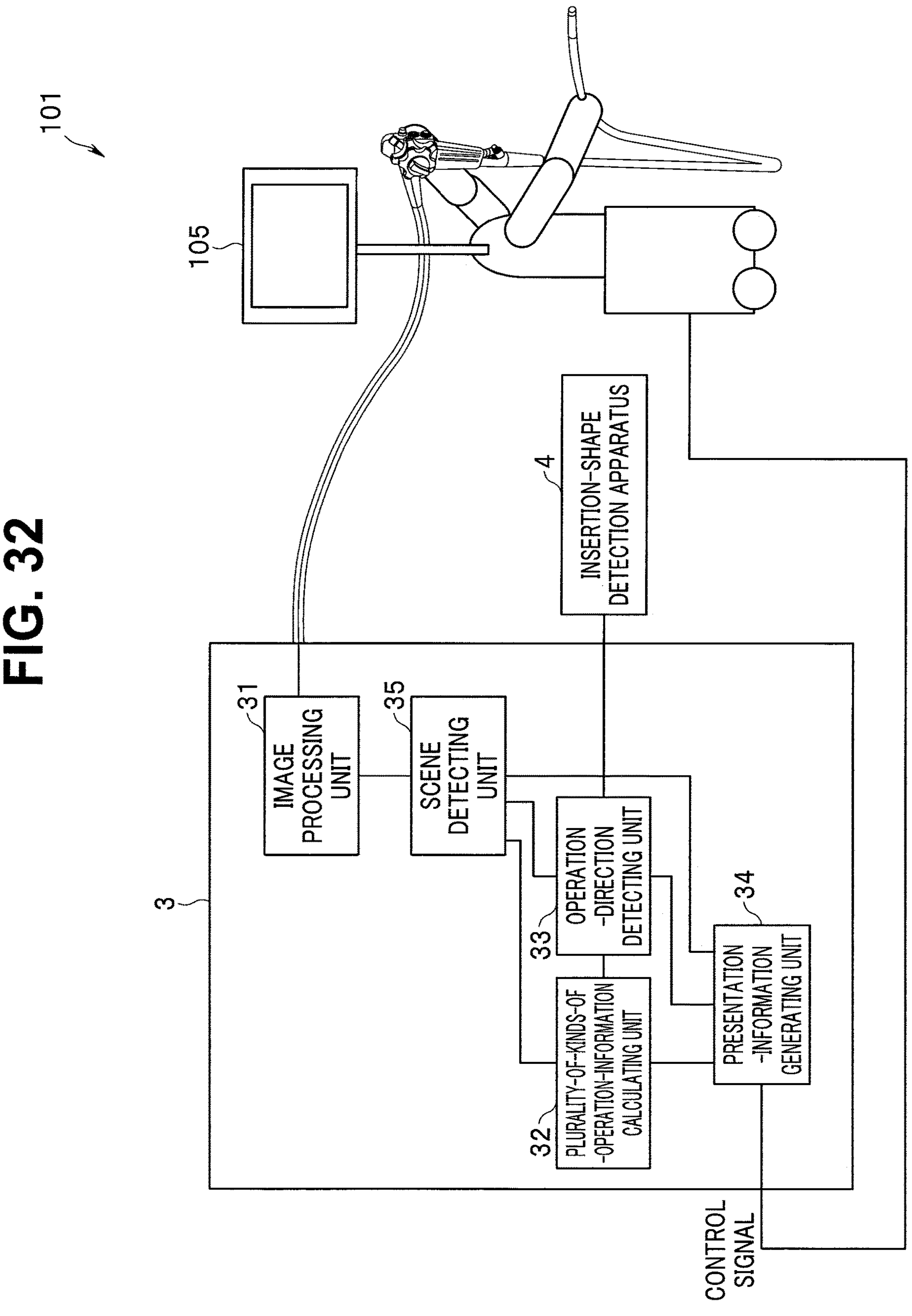
FIG. 32 is a block diagram showing a configuration of an endoscope system including a movement support system and an automatic insertion apparatus according to a fifth embodiment of the present invention.

FIG. 32 is a block diagram showing a configuration of the endoscope system including the movement support system and the automatic insertion apparatus according to the fifth embodiment of the present invention.

As shown in FIG. 32, the movement support system 101 according to the fifth embodiment includes the endoscope 2 forming the same configuration as the configuration in the first and second embodiments, the not-shown light source apparatus, the video processor 3, the insertion-shape detection apparatus 4, the monitor 5, and an automatic insertion apparatus 105 that automatically or semiautomatically executes inserting operation of the insertion section 6 in the endoscope 2.

The endoscope 2 forms the same configuration as the configuration in the first embodiment. The insertion section 6 is configured by providing the rigid distal end portion 7, a bendably formed bending section, and a long flexible tube section having flexibility in order from a distal end side.

In the distal end portion 7, the image pickup unit 21 configured to perform an operation corresponding to an image pickup control signal supplied from the video processor 3 and pick up an image of an object illuminated by illumination light emitted through an illumination window and output an image pickup signal is provided. The image pickup unit 21 includes an image sensor such as a CMOS image sensor or a CCD image sensor.

In the fifth embodiment, the video processor 3 includes a control unit that manages control of respective circuits in the video processor 3 and includes the image processing unit 31, the plurality-of-kinds-of-operation-information calculating unit 32, the operation-direction detecting unit 33, the presentation-information generating unit 34, and the scene detecting unit 35.

As in the first embodiment, the image processing unit 31 is configured to acquire an image pickup signal outputted from the endoscope 2, apply predetermined image processing to the image pickup signal to generate a time-series endoscopic image, and perform a predetermined operation for causing the monitor 5 to display the endoscopic image generated by the image processing unit 31.

As in the second embodiment, the scene detecting unit 35 classifies a state of the endoscopic image based on a picked-up image from the image processing unit 31 using an approach by machine learning or an approach of detecting a feature value. As explained above, types of classifications are, for example, a "folded lumen", "pressing into an intestinal wall", a "diverticulum", and others (a state in which a guide is unnecessary such as a normal lumen).

When a scene detected by the scene detecting unit 35 is a "folded lumen", as in the first embodiment, the plurality-of-kinds-of-operation-information calculating unit 32 calculates, based on a picked-up image acquired by the image pickup unit 21 disposed in the insertion section 6 in the endoscope 2, a plurality of kinds of operation information indicating a temporally different plurality of kinds of operation corresponding to a plurality of kinds of operation target scene, which is a scene for which "a temporally different plurality of kinds of operation" are necessary.

In the fifth embodiment, the presentation-information generating unit 34 generates, based on the plurality of kinds of operation information calculated by the plurality-of-kinds-of-operation-information calculating unit 32, a control signal (presentation information) for the automatic insertion apparatus 105 and outputs the control signal (the presentation information). The control signal is a signal corresponding to inserting operation guide information of the insertion section 6 calculated by the same approach as the approach in the respective embodiments explained above (the approach by machine learning or the like).

The automatic insertion apparatus 105 is configured to receive the control signal outputted from the presentation-information generating unit 34 and perform, under control by the control signal, inserting operation of the insertion section 6 to be gripped.

Effects of the Fifth Embodiment

With the movement support system 101 in the fifth embodiment, in an inserting operation of an endoscope insertion section by the automatic insertion apparatus 105, insertion control is performed on inserting operation guide information calculated by the same approach as the approach in the respective embodiments explained above (the approach by machine learning or the like). Consequently, for example, even when the automatic insertion apparatus 105 faces a scene requiring “a temporally different plurality of kinds of operation” such as a folded lumen, the automatic insertion apparatus 105 can execute an accurate inserting operation.

The present invention is not limited to the embodiments explained above. Various changes, alterations, and the like are possible within a range not changing the gist of the invention.

For example, in the above explanation, a case in which the present invention is the control apparatus is mainly explained. However, the present invention is not limited to this and may be a movement support method for supporting movement of an endoscope in the same manner as the control apparatus or may be a learned model (a computer program) for causing a computer to function in the same manner as the control apparatus, a computer-readable non-transitory recording medium recording the learned model, and the like.

What is claimed is:

1. A control apparatus comprising:

at least one processor comprising hardware, wherein the at least one processor is configured to:

detect an image pickup scene based on an endoscopic image acquired by an endoscope, calculate operation information corresponding to the image pickup scene, the operation information including first operation information of a first operation for the endoscope and second operation information of a second operation for the endoscope and the second operation being an operation after the first operation in time series and different from the first operation, and simultaneously output the first operation information and the second operation information as the operation information corresponding to the image pickup scene, wherein:

the processor outputs, to a monitor, the operation information corresponding to the image pickup scene as an operation guide;

the operation guide includes a first operation guide indicating the first operation and a second operation guide indicating the second operation; and the processor displays an arrow in which the first operation guide and the second operation guide are combined.

2. The control apparatus according to claim 1, wherein the image pickup scene is a folded lumen.

3. The control apparatus according to claim 1, wherein the arrow has a taper shape becoming smaller from the first operation guide to the second operation guide.

4. The control apparatus according to claim 1, wherein the arrow is displayed in gradation.

5. The control apparatus according to claim 1, wherein the processor detects a direction in which the endoscope is caused to slip into a folded lumen when the image pickup scene is the folded lumen and outputs the direction as the operation information corresponding to the image pickup scene.

6. The control apparatus according to claim 1, wherein the processor outputs the operation information corresponding to the image pickup scene when the processor detects that the image pickup scene is pressing into an intestine and insertion into a folded lumen is not being performed.

7. The control apparatus according to claim 1, wherein the processor outputs information indicating presence of a diverticulum when the image pickup scene is the diverticulum.

8. The control apparatus according to claim 1, wherein the processor stops outputting the operation information corresponding to the image pickup scene when the processor detects that the endoscope reaches an intestinal cecum.

9. The control apparatus according to claim 1, wherein the processor displays the arrow near a folded lumen.

10. The control apparatus according to claim 1, wherein the processor displays a folded lumen with emphasis.

11. The control apparatus according to claim 1, wherein the processor records the operation information corresponding to the image pickup scene and when the image pickup scene is a scene in which a lumen is lost sight of, detects a movement of the endoscope in the scene in which the lumen is lost sight of.

12. The control apparatus according to claim 11, wherein when the image pickup scene is not a folded lumen, the processor calculates a direction in which the folded lumen is present based on the movement of the endoscope in the image pickup scene in which the lumen is lost sight of.

13. The control apparatus according to claim 12, wherein the processor outputs information indicating an operation in which the endoscope is caused to slip into the folded lumen.

14. The control apparatus according to claim 1, wherein the processor outputs to the monitor the first operation guide and the second operation guide with numbers indicating order of operation.

15. The control apparatus according to claim 1, wherein the operation information corresponding to the image pickup scene is calculated based on a machine learning model.

16. An endoscope system comprising:

an endoscope; and at least one processor comprising hardware, the at least one processor being configured to:

detect an image pickup scene based on an endoscopic image acquired by the endoscope, calculate operation information corresponding to the image pickup scene, the operation information including first operation information of a first operation for the endoscope and second operation information of a second operation for the endoscope and the second operation being an operation after the first operation in time series and different from the first operation, and simultaneously output the first operation information and the second operation information as the operation information corresponding to the image pickup scene, wherein:

the processor outputs, to a monitor, the operation information corresponding to the image pickup scene as an operation guide;

the operation guide includes a first operation guide indicating the first operation and a second operation guide indicating the second operation; and the processor displays an arrow in which the first operation guide and the second operation guide are combined.

17. The endoscope system according to claim 16, wherein the image pickup scene is a folded lumen.

* * * * *